(12) United States Patent
Flaherty et al.

(10) Patent No.: US 8,225,679 B2
(45) Date of Patent: Jul. 24, 2012

(54) TORQUE INDICATOR DEVICE FOR A LOAD CARRIER

(75) Inventors: Joseph R. Flaherty, Prospect, CT (US); William E. Fortune, Jr., Branford, CT (US); Keith Prescott, Cambridge, VT (US); Joakim Persson, Skillingaryd (SE); Eric Anders Gustavsson, Vamamo (SE)

(73) Assignee: Thule Sweden AB (SE)

( * ) Notice: Subject to any disclaimer, the term of this patent is extended or adjusted under 35 U.S.C. 154(b) by 315 days.

(21) Appl. No.: 12/607,819

(22) Filed: Oct. 28, 2009

(65) Prior Publication Data
US 2010/0192704 A1 Aug. 5, 2010

Related U.S. Application Data

(60) Provisional application No. 61/149,883, filed on Feb. 4, 2009.

(30) Foreign Application Priority Data

Apr. 4, 2009 (WO) .................. PCT/EP2009/054900

(51) Int. Cl.
*B25B 23/14* (2006.01)
(52) U.S. Cl. ..................... 73/862.21; 224/321
(58) Field of Classification Search ............ 73/760, 73/862.08, 862.21; 224/321
See application file for complete search history.

(56) References Cited

U.S. PATENT DOCUMENTS

| | | | | |
|---|---|---|---|---|
| 4,087,029 A | * | 5/1978 | Shoemaker | 224/310 |
| 4,516,710 A | * | 5/1985 | Bott | 224/324 |
| 4,944,439 A | * | 7/1990 | Bott | 224/326 |
| 5,071,050 A | * | 12/1991 | Pudney et al. | 224/321 |
| 5,375,750 A | * | 12/1994 | Mandarino et al. | 224/321 |
| 5,549,229 A | * | 8/1996 | Grabowski | 224/321 |
| 6,056,176 A | * | 5/2000 | Aftanas et al. | 224/321 |
| 6,070,774 A | * | 6/2000 | Rak et al. | 224/321 |
| 6,439,086 B1 | | 8/2002 | Bahr | |
| 6,672,655 B2 | * | 1/2004 | Zinsmeister et al. | 296/210 |
| 7,448,523 B2 | * | 11/2008 | Aftanas et al. | 224/321 |

FOREIGN PATENT DOCUMENTS

| | | |
|---|---|---|
| DE | 10014060 A1 | 10/2001 |
| DE | 102004007372 A1 | 9/2005 |
| EP | 1142760 A1 | 10/2001 |
| EP | 1649980 A | 4/2006 |

OTHER PUBLICATIONS

International Search Report, PCT/EP2009/054900, Sep. 4, 2009.
Written Opinion, PCT/EP2009/054900, Sep. 4, 2009.

* cited by examiner

*Primary Examiner* — Max Noori
(74) *Attorney, Agent, or Firm* — Novak Druve + Quigg LLP

(57) ABSTRACT

The present invention relates to a load carrier foot (1) and a torque indicator device (25, 34, 44, 532, 74) for use with various sports equipment accessory devices, preferably a load carrier foot, the torque indicator providing a signal alerting an operator that a desired torque has been reached, thereby avoiding over-tightening or under-tightening of the device.

23 Claims, 18 Drawing Sheets

TORQUE INDICATOR DEVICE FOR A LOAD CARRIER

CROSS-REFERENCES TO RELATED APPLICATIONS

The present application claims priority to PCT application PCT/EP2009/054900 filed Apr. 4, 2009 which claims priority to provisional application U.S. Ser. No. 61/149,883. The present application also claims priority to provisional application U.S. Ser. No. 61/149,883. Both the PCT and provisional applications are hereby expressly incorporated by reference into the present application in their entireties.

TECHNICAL FIELD

The present invention relates generally to torque indicators for sports related equipment and devices, and in particular load carrier foot devices. The torque indicators provide visible and/or audible signals for operators who need to tighten sports related equipment such as load carrier devices for attachment onto a vehicle roof or for tightening interrelated parts. Additionally, the torque indicators of the present invention may have protective mechanisms against exceeding particular maximum or predetermined torques for safety of the devices and proper installation and handling thereof.

BACKGROUND

Due to the increasingly large number of sports and recreational activities enthusiasts now engage, there is a corresponding demand that sporting equipment also support the diversity and nature of these activities. Furthermore, there is a demand that the equipment be useable in many different situations. Accordingly, sporting equipment is often designed to be adjustable, allowing it to be applied in more situations, be removable and be useable with various secondary devices.

One such type of sports related equipment is the load carrier foot device which typically attaches load bars to vehicle roofs. Advantageously, such load carrier foot devices have been designed so that they can each be mounted on many types of vehicles of various sizes and shapes. Typically via the attached load bars, the load carrier foot provides a means for mounting additional sporting goods on top of a vehicle for conveniently transporting them to desired locations. One such load carrier device is a load carrier foot disclosed in U.S. Pat. No. 6,641,012 the disclosure of which is herein expressly incorporated by reference in its entirety.

There are many types of load carrier foot devices, for example, those which are adapted to clamp to a railing which is mounted on a vehicle. One prominent type of load carrier foot, however, has an upper portion which interacts with the load carrier bar and further has a lower portion which grips and abuts the upper edge portion of the vehicle roof. A clamping plate can be used along with a fastening bolt for tightening the load carrier foot to the roof and safely fixing it thereon.

In order to fasten the clamping plate onto the vehicle roof or rail, a user or operator must tighten the load carrier foot. In order to do so, a bolt, wrench, or fastening mechanism must be turned by the operator and torque applied for such tightening. In the past, an operator has had to guess at what point the load carrier foot is suitably tightened. Undesirably, if it is too loose, the foot may accidentally come off the vehicle. On the other hand, if it is over-tightened various drawbacks can also occur such as causing damage to the vehicle roof or crossbar, the bolt or fastener can be stripped or damaged, and there can be damage to other components to the foot device, as well.

The same applies to other sporting equipment that requires tightening or adjustment by an operator. Such sporting equipment applications include attaching accessories devices such as a bike rack to a load bar, where appropriate level of tightness can be important. The operator is given no guide for an appropriately applied torque, whether too much or too little. There is a need therefore for means of notifying an operator who is tightening the load carrier foot or other sports equipment when an appropriate torque or tightness has been achieved. Furthermore, there is a need for a mechanism which may prevent an operator from over-tightening and causing damage to the device itself or object it is attached to.

In view of the above described deficiencies associated with the use of known sports carriers and equipment that require tightening features, the present invention has been developed to alleviate the drawbacks and provide further benefits to the user. These enhancements and benefits are described in greater detail hereinbelow with respect to several alternative embodiments of the present invention.

SUMMARY

The present invention in its several disclosed embodiments alleviates the drawbacks described above with respect to indicating with a signal, either visibly, audibly, and/or tactile feel, that the load carrier foot or other type of equipment has been fully tightened. Additionally, the torque indicators of the present invention in some embodiments additionally provide a protective mechanism for preventing over-tightening of the target device.

Other advantages of several of the embodiments of the torque indicator include its small size, making it more convenient for use with load carrier foots. The small length and width of the handle make it so that it can fit in the potentially small housing of many sports devices, such as a load carrier foot. Such requirements for small size in many cases prohibit the use of conventional torque indicators.

Additionally, sports devices such as a load carrier foot are used in many different environments and subject to various weather and temperatures. Accordingly, the torque indicators according to several of the embodiments of the present invention should work in all different temperature environments including cold and warm climates. Therefore, the materials used, such as a metal or elastomeric material in the torque indicators should behave similarly in different temperature environments; that is, both in typical hot and cold ambient conditions and climates.

Furthermore, the torque indicators according to several embodiments of the present invention have the additional advantages of simple construction, are comprised of low cost materials, allow low cost manufacture, are easy to assemble, light weight, handle easily, with ease of gripping.

Some embodiments may provide for a load carrier foot for securing a load carrier cross bar to a transporting vehicle, the load carrier including a connective element adapted for connection with the load carrier cross bar; a fastening member adapted for tightening the load carrier foot to the external portion of the vehicle thereby securing the load carrier foot thereto; the fastening member having a tightened configuration wherein the fastening member is tightened to a predetermined tightening force; and an indicator element having a signal perceivable by an operator in the tightened configuration and wherein the signal is not perceivable by the operator prior to reaching the tightened configuration.

Other embodiments provide for a load carrier foot releasably securable to an external portion of a transporting vehicle for mounting a load carrier bar thereon, the load carrier foot including a connective element adapted for connection with the load carrier cross bar; a fastening member adapted for tightening the load carrier foot to the external portion of the transporting vehicle thereby securing the load carrier foot to the transporting vehicle; the fastening member having a tightened configuration wherein the fastening member is tightened to a predetermined tightening force; a head portion connected with the fastening member, the head portion having a first section and a second section, at least one of the first and second sections being rotatable with respect to the other, and each having visible markings, wherein the head portion comprises a biasing member cooperating with the fastening member and capable of imparting a torque to the fastening member when the head portion is rotated; the biasing member configured to enable rotation of one of the first and second sections with respect to the other when torque is applied to the biasing member, the visible markings together forming a signal perceivable by an operator upon rotation of one of the first and second sections when the tightened configuration is reached, the predetermined tightening force being reached when a predetermined torque is applied to the biasing member, not being viewable by the operator prior to reaching the tightened configuration. Additionally, in some embodiments, the signal is a predetermined pattern of the visible markings.

Other embodiments may provide for a load bearing system for a transporting vehicle, the system including a load carrier cross bar, a load carrier foot having a connective element adapted for connection the load carrier cross bar; the load carrier foot further comprising a fastening member adapted for tightening the load carrier foot to the external portion of the transporting vehicle thereby securing the load carrier foot to the transporting vehicle; the fastening member having a tightened configuration wherein the fastening member is tightened to a predetermined tightening force; and an indicator element having a signal perceivable by an operator in the tightened configuration and wherein the signal is not perceivable by the operator prior to reaching the tightened configuration.

BRIEF DESCRIPTION OF THE DRAWINGS

The invention will now be described in greater detail in the following way of example only and with reference to the attached drawings, in which.

DETAILED DESCRIPTION

As required, detailed description of embodiments of the present invention are disclosed herein; however, it is to be understood that the disclosed embodiments are merely exemplary of the invention that may be embodied in various and alternative forms. The figures are not necessarily to scale. Some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

The torque indicators according to several embodiments can be used for providing a signal which is perceivable by an operator with respect to fastening members which are used for tightening or applying torque to particular parts of sports equipment devices or attachment of accessories. In some embodiments, the sports equipment devices include attaching a bicycle rack to an external portion of a vehicle, such as the roof of the vehicle, a load bar, a railing mounted on a vehicle, or to a fixed point, or other portion of the vehicle. Additionally, the torque indicators according to multiple embodiments of the present invention may be used for tightening a bicycle rack to a hitch on the rear of a vehicle, thus allowing an operator to tighten the device to a predetermined amount.

In some embodiments the torque indicators according to several embodiments may be used in combination with a mounting system or a universal mounting system that could attach one or more, or all of the following accessories, including Kayak Carriers, J-cradle kayak carriers, folding kayak carriers, bike racks, fork mount bike racks, upright bike racks, strap style bike racks, hanging style strap mount bike racks, platform style strap mount bike racks, trunk mount bike racks, bike rack with ratcheting tie downs, ratcheting tie down lashings, ski carriers, roof top ski carriers, inside cargo box ski carriers, snow board carriers, surf board carriers, cargo box anchor attachments, hitch style bike racks, hitch style ski carriers, hitch style trailer balls, tie down straps, tie down cables, roof top boat carriers, golf club carriers, snow chains, cargo bags, hitch baskets, cargo lift systems, cargo lift assist systems, bike lift assist systems, ladder racks, truck cargo boxes, tool boxes.

In a preferred embodiment, and that which is described in most detail here, the sports equipment device takes the form of a load carrier foot that is attachable to the roof of a carrying vehicle such as a passenger car. Furthermore, the signal can be a visual or audible signal, or a tactile signal and in some embodiments may protect against over-tightening of the sports equipment device.

Figure 1:
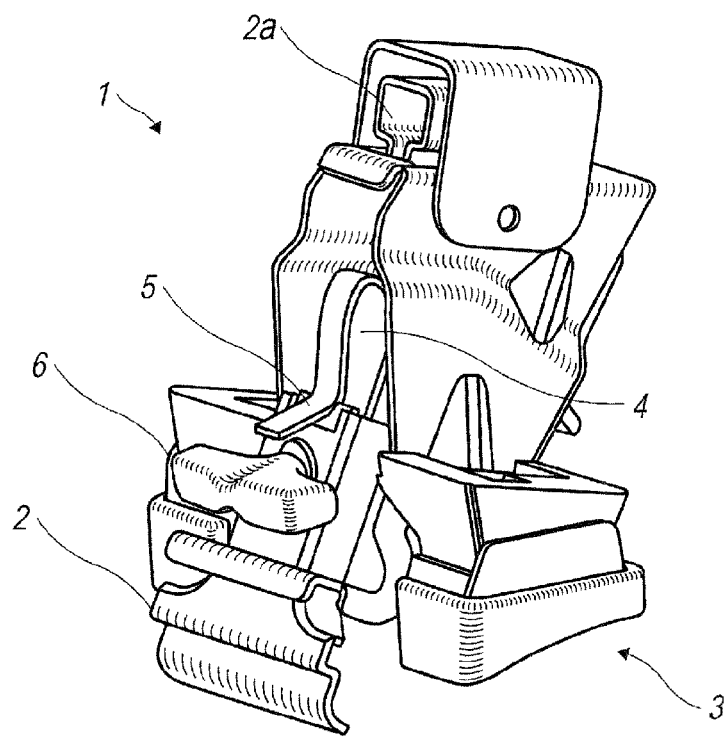
FIG. 1 is a perspective view of one embodiment of a load carrier foot which may be used with several torque indicator embodiments of the present invention.

Referring to the figures, wherein like numbers refer to like parts throughout the several views, a perspective view of one embodiment of a load carrier foot device is disclosed in FIG. 1. The load carrier foot 1 as shown in FIG. 1 is attachable to the roof of a vehicle. The attachment is provided by the action of several interrelated component parts. In particular, the forces may be applied by the gripping member 2, which may also be referred to as a gripping clamp, which will act to grip an upper edge portion of the vehicle. Depending on the vehicle, the gripping member 2 may engage with areas just beneath the roof, the doorway, or anchor portions which have been designed to interact with such gripping member to aid in securement of the device. Furthermore, there may be other portions near the edge of the vehicle roof which may also serve as an anchor for the gripping member 2, even if not intentionally designed for such purpose. Near the upper portion of the load carrier foot 1 is a connective element 2a adapted for connecting a load carrier crossbar. In the preferred embodiment, the connective element is an aperture, however, in other embodiments and load carrier foot devices, the connective element will connect with a carrier crossbar without the need of having an opening or aperture.

Additionally near the lower end of the load carrier foot is an abutment portion 3 which will press against the vehicle roof when the load carrier foot is engaged. When the load carrier foot is tightened, the gripping member 2 will have an upwardly and inwardly directed force applied causing it to pull against the roof edge portion, while at the same time, the abutment portion will be urged against the vehicle roof. By means of this cooperation of forces, the load carrier foot 1 is secured against the vehicle. The proportions of these forces may vary based on the design of the foot as well as the various vehicles. Preferably, the abutment portion 3 is comprised of some elastomeric or soft material such as rubber or soft plastic that avoids damage by the foot to the vehicle.

In other embodiments where the load carrier foot attaches to a rail on a vehicle roof, the load carrier will have a gripping member which grips the rail to secure the load carrier foot thereon. In still other embodiments the gripping member can grip any portion of the vehicle, including the rail or roof edge for securement of the load carrier foot. In other embodiments, the load carrier foot may attach to the rail by resting on the rail and additionally having a strap pass from the load carrier foot beneath the rail and again connecting with the load carrier foot. A fastening member is used to tighten the strap around the rail portion in order to secure the load carrier onto the rail. A torque indicator according to several embodiments may be used with the fastening member so that there is not under or over tightening of the device onto the rail.

Additionally, many automobiles in recent times are fabricated with fixed points which are specialized hardened or specially shaped portions of the automobile which allow attachment of devices thereon including load carriers. In some embodiments the load carrier may be of the type which attaches to such fixed point of a transporting vehicle. For example, the fixed point may be located on or proximate to the roof of the vehicle. In some embodiments, a fixed point on a vehicle may allow a load carrier foot to be attached directly to the fixed point by use of one or more fasteners. For example, a bracket may be placed up against the fixed point with the one or more fasteners tightened into the fixed point and load carrier foot to secure the load carrier foot onto the fixed point of the transporting vehicle. A torque indicator according to several embodiments may be used with the one or more fastening members so that there is not under or over tightening of the device onto the fixed point.

Referring again to FIG. 1, load carrier foot 1 has an intermediate force cooperating member 4 which contacts the gripping member 2. The intermediate force cooperating member 4 ("intermediate member") has an aperture which is aligned also with an aperture in the gripping member 2. Preferably, the intermediate member 4 will have a portion that rests flat against the inner surface of the gripping member 2. Additionally, in the embodiment shown in FIG. 1, the intermediate member 4 will protrude around the edges of the aperture and extend through the aperture of the gripping member 2. The intermediate member 4 additionally has a clip 5 on its upper end which extends over and biases against the top portion of the gripping member 2. The gripping member may additionally have a slant or indentation for receiving the clip 5.

The load carrier foot 1 additionally shows a handle 6 which extends from a fastening member that passes through the apertures of the gripping member 2, as well as the intermediate member 4. During installation of the carrier foot 1, an operator will turn the handle to tighten the load carrier. This acts to urge the gripping member 2 upward and inward, while additionally forcing the other component parts in a downward direction toward the gripping member 2. Furthermore, this causes the abutment member 3 to be forced against the roof of the vehicle. The ways this can be affected are further described pursuant to the embodiments discussed below.

Figure 2:
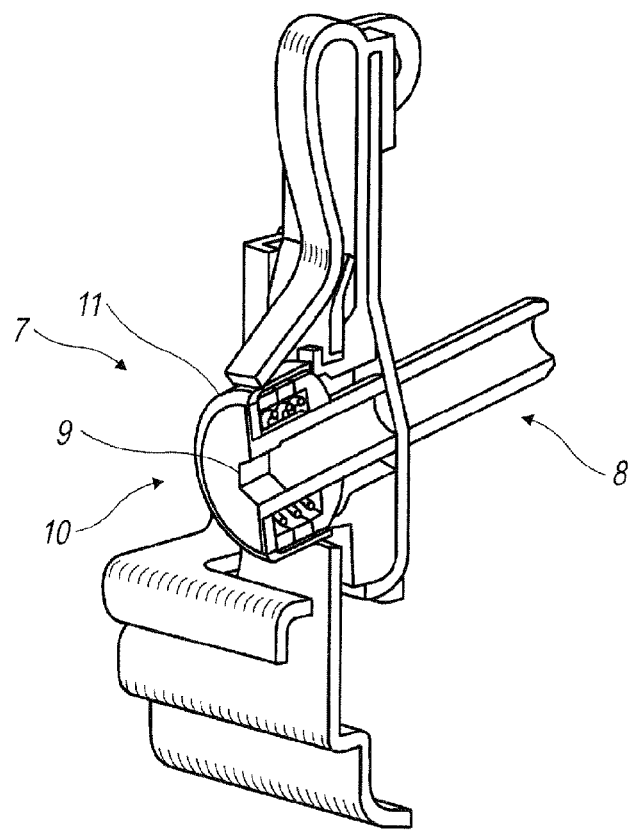
FIG. 2 is a perspective view of one embodiment of a torque indicator having a coiled spring and displaying internal components thereof.
Figure 3:
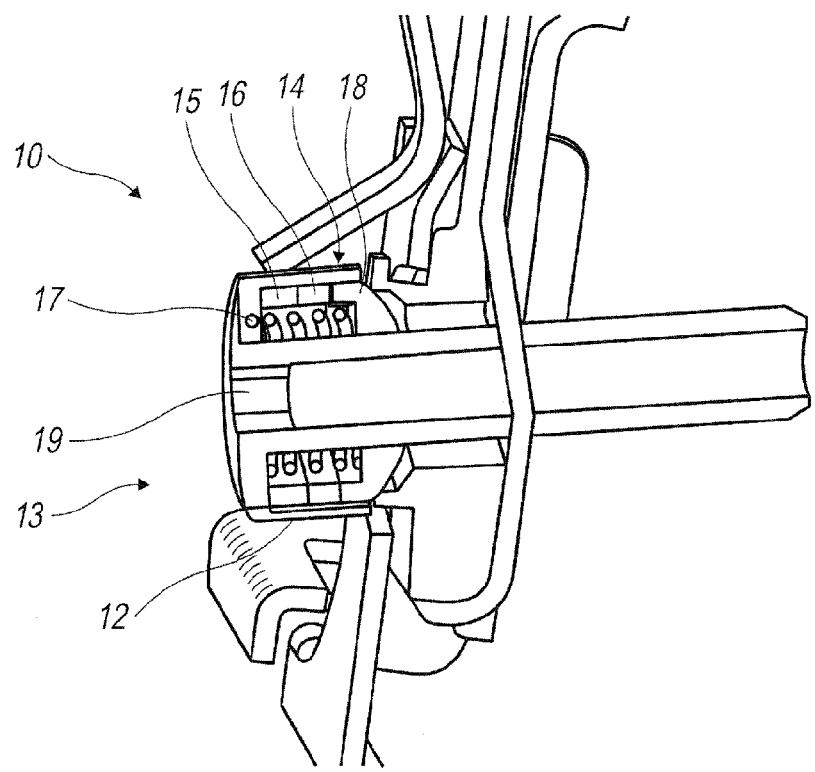
FIG. 3 is a side view of one embodiment of the present invention of a torque indicator having a coiled spring and displaying internal components thereof.
Figure 4:
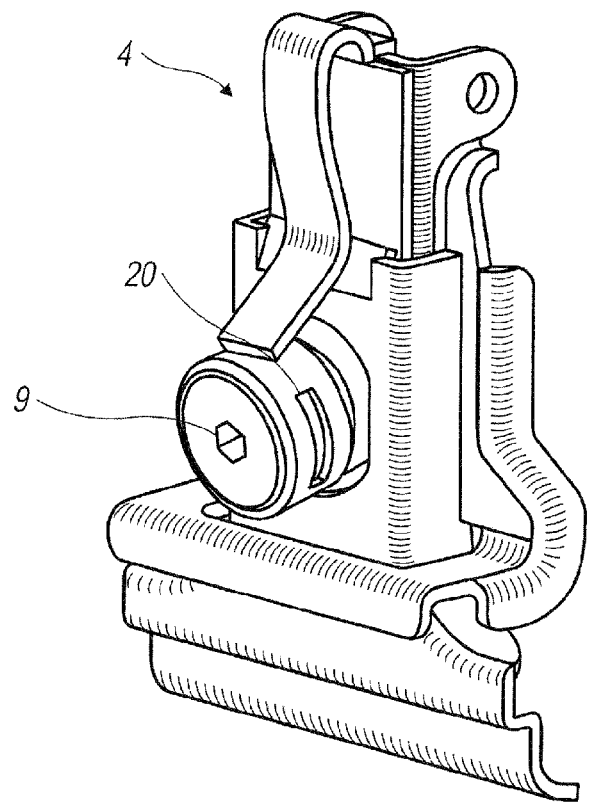
FIG. 4 is a perspective view of one embodiment of the present invention of a torque indicator having a coiled spring.

FIGS. 2-4 illustrate a torque indicator 7 which utilizes a visual signal to alert the operator that the desired torque and/or tightness has been reached. For example, as shown in FIG. 2, a longitudinal fastening member 8 having an internal hollow bore, extends through the gripping member 2 as well as the intermediate member 5. One end of the fastening member 8 extends internally to the foot carrier, whereas the other end extends toward the outside of the intermediate member thereby providing an aperture 9 for receiving a fastening tool. The fastening member 8 further comprises a head portion 10 having a housing 11 which encloses internal components of the torque indicator 7. In the embodiment shown, the head portion is circular, however, other shapes may be sufficient for use, whether rectangular, square, or other polygonal shapes.

The internal components of the torque indicator 7 are further illustrated in FIG. 3. As shown therein, the head portion 10 is made up of a housing 11 which has a side portion 12 as well as flanged head 13. The flanged head 13 extends from the end of the fastening member 10 toward the side portion 12 and serves as a front cover for the head portion 10. The aperture 9 is preferably in the center of the flanged head 13 which is shaped to receive a fastening tool, for example an alien key. Within the housing is contained an indicator element 14, made up of visible signals, namely colored indicator bands 15 and 16, as well as a biasing member 17. Additionally, there is a lower blocking portion 18 which abuts against the intermediate member 4. In this embodiment, the biasing member is preferably a coiled spring, however other suitable springs or biasing mechanisms may also be used.

Preferably, immediately within the aperture 9, the hollowed fastening member 8 will preferably have an internal receiving structure 19 shaped to allow a fastening tool such as a socket key with an alien wrench axle shape, or other tool such as an alien wrench, with reciprocating structure to be inserted therein and provide resistance so that upon turning of the fastening tool, the fastening member 8 will turn with it also. For example, the internal hollow bore of the fastening member 8 may have a portion that is circular, however, the portion of the internal hollow bore of the fastening member 8 comprising the receiving structure 19 would have a different shape such as a square or other polygonal configuration. The receiving structure 19 may also extend along the whole length of the internal hollow bore of the fastening member such that no portion of the internal hollow bore of the fastening member 8 is circular or shaped differently than receiving structure 19. Accordingly, a socket key having a square shape, with appropriately sized dimensions, could be inserted into the receiving structure 19 to turn the fastening member 8.

When the fastening member 8 is rotated by an operator, the housing 11, which includes the side portion 12 and flanged head 13, will rotate also. The side portion 12 may be integrated with the flanged head 13 so that it rotates along with the fastening member, however, it may also be independent of the flanged head 13. If independent from the flanged head 13, the side portion will move toward the intermediate member along with the rest of the housing, but will not rotate. However, the internal components, including colored indicator bands 15 and 16, as well as a biasing member 17 will not rotate but remain stationary. Accordingly, as the fastening member 8 is tightened, the flanged head 13 will press against the biasing member 17. The biasing member is calibrated to compress depending on the amount of load applied, and is further calibrated such that a particular color indicator band is fully displayed at when a certain predetermined load is applied to the spring. Accordingly, when the fastening member is tightened, the flanged head 13 will press against the spring and the spring will bias against the lower blocking portion 18. The blocking portion will then be forced against the intermediate member 4, thereby tightening the load foot against the vehicle.

As an operator tightens the fastening member 8, there will be greater force placed on the biasing member 17. As indicated above, the biasing member will be configured, or calibrated, to compress to a certain degree in dependence upon the predetermined load. Additionally, the side portion 12 of the housing 11 is designed to contain a window. This window can be shaped, for example, to lie over indicator band 15 prior to fastening of the load carrier foot. As the fastening member is tightened, the biasing spring will begin to contract thereby allowing the housing 11 to move along with the window thereby gradually shifting the window from lying over indicator band 15 to lying over indicator band 16. The biasing member is calibrated so that at a predetermined compressive force, the window on housing 11 will lay fully over band 16. Therefore, upon turning of the fastening member and tightening thereof to a particular tightening force, the biasing element will reach a predetermined calibrated compressive force thereby completing the shift from indicator band 15 to indicator band 16. Accordingly, an operator viewing the indicator band 15 through the window of the housing 11 would see that the fastening member has not been tightened. In some embodiments, when no compressive force has been applied to the biasing member, the window will lie fully over band 15. However, after tightening the fastening member 8 to a sufficient degree, the biasing member 17 will compress and the operator will be able to view the indicator band 16 through the window, thus alerting the operator that he or she should cease the tightening operation.

This window 20 is more conveniently illustrated in FIG. 4. If the side portion 12 is integrated with the flanged head 13, then it will rotate around as the fastening member is tightened. However, if independent from the flanged head 13, the window 20 will not rotate, allowing an operator to easily see within the housing to any indicator elements therein. Furthermore, it need not be a rectangular shape as shown therein, but may be take on a variety of shapes, including circular. Additionally, there are other methods of providing a visible color signal. For example, there need not be "bands" of different colors, there can be merely one color band, or merely stickers with various colors applied thereon. In the preferred embodiment however, band 15 is red, showing that full torque has not yet been applied, and band 16 is green, showing that the load carrier foot has been fully tightened. Additionally, in other embodiments, the visible signal need not be colors, but can also be patterns, or markings which when in certain pattern arrangement, indicate that proper torque has been applied and the device is fully tightened.

In another embodiment the signal can be provided by placing electrical contacts on either end of the biasing member 17. Accordingly, when the fastening member 8 is tightened and the biasing member compresses, the contacts will move toward one another. When the desired torque is reached, and the biasing member is compressed to a predetermined degree, the electrical contacts on either end of the biasing member are closed. This causes the electrical circuit to be complete. A light, LED, or alarm could be connected with the circuit thereby providing signal either visually or audibly. Therefore, when insufficient torque is applied, an operator will know that the fastener is yet tightened, and furthermore, when the audio or visual signal is effectuated, the operator will have been informed that the fastener is fully tightened. The visible signal can be a light, or blinking light, or LED and can exterior to the housing 11 or shown in the window 20. If an audio signal is used a speaker can be used either within the housing 11 or exterior to the housing for providing the signal. By similar method, lights, LEDs or audible signals could be combined with other embodiments described herein.

Figure 5:
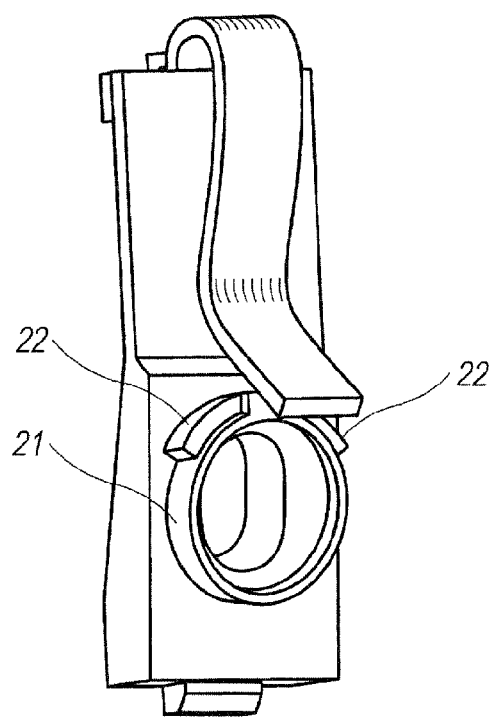
FIG. 5 is a front perspective view of an intermediate member having an elastomeric biasing member.
Figure 6:
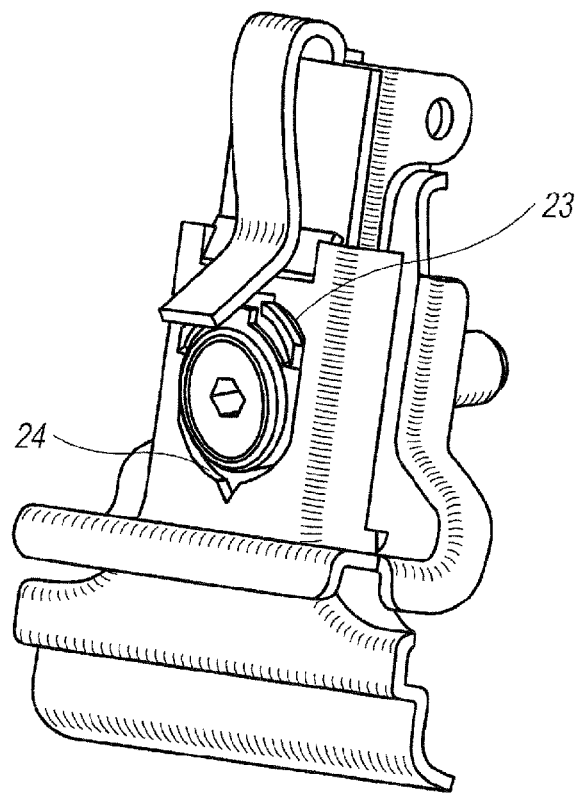
FIG. 6 is a front perspective view of a torque indicator having an elastomeric biasing member.

An additional torque indicator embodiment is shown in FIGS. 5 and 6. As shown in FIG. 5, the intermediate member 4 has a protrusion 21 around the edge of the aperture. Adjacent the protrusion 21 are two compression members 22. In the embodiment shown in FIGS. 5 and 6, there are two such members 22, however, in other embodiments there may be one or more compression members 22. Preferably the members 22 are made of an elastomeric material such as natural or synthetic rubber, or soft plastic which is capable of deformation. As shown in FIG. 6, the gripping member 4 will have blockers 23 against which the compression members 22 are pressed. The gripping member 2 further has a window 24 for displaying a visible signal when fully tightened. In the embodiment shown in FIG. 5, it is in the lower edge of the aperture of the gripping member 2, however it may additionally be located at the top or at other points around the edge. The window 24 need not be on the edge of the aperture, but instead may be spaced a distance from the aperture.

Accordingly, upon tightening of the fastening member 8, the compression members 22 will be urged against the blockers 23 with increasing pressure and have the effect of tightening the load carrier foot against the vehicle. The compression members 22 are calibrated to compress to a degree depending on the amount of load applied. As the fastening member is tightened, the compression members will contract, causing the gripping member 2 and intermediate member 4 to move with respect to one another. As a result, the window 24 will move downward with respect to the intermediate member. As the window moves, there can be a visible signal, such as a marking or color signal which is revealed as the fastening member is tightened. The window together with the visible signal may be considered an indicator element. The compression members 22 are calibrated so that at a predetermined compressive force, the window on the gripping member will lay fully over a visible signal. Therefore, upon turning of the fastening member and tightening thereof to a particular tightening force, the compression element will reach a predetermined calibrated compressive force thereby completing the shift of the window to lay fully over the visible signal. In other embodiments, the signal to an operator need not be such that the window lay fully over the visible signal, but merely partially, or alternatively, some other marking. The signal used, or how it is revealed may vary, however, any such signal and revelation thereof will indicate to an operator that the full tightening force has been reached, and no further tightening should be done.

Additionally, in some embodiments the compression members 22 can be elastomeric and be employed in the torque indicator for multiple uses. In other embodiments, the compression members 22 may not completely return to the original shape after first use, or after a number of uses. In such a case where the compression members 22 do not return to original shape, if needed, recalibration of the compression members 22 can be conducted so that they can be re-used. In alternative embodiments, the compression members 22 could actually be designed to plastically deform without returning to its original shape and thus would be disposable. Additionally, the compression members 22 can be replaceable, such that a single or limited number of uses can be accomplished prior to replacement.

Figure 7:
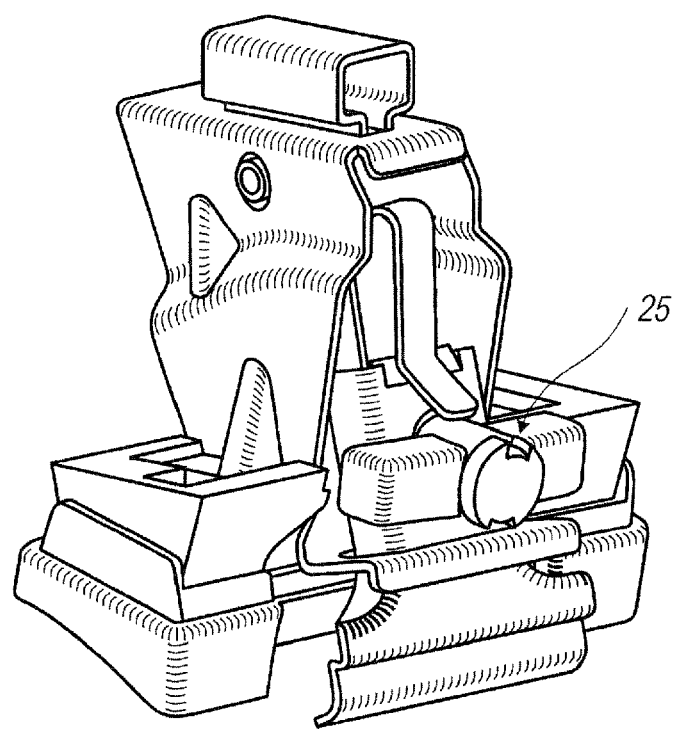
FIG. 7 is a front perspective view of one embodiment of a torque indicator according to the present invention.
Figure 8:
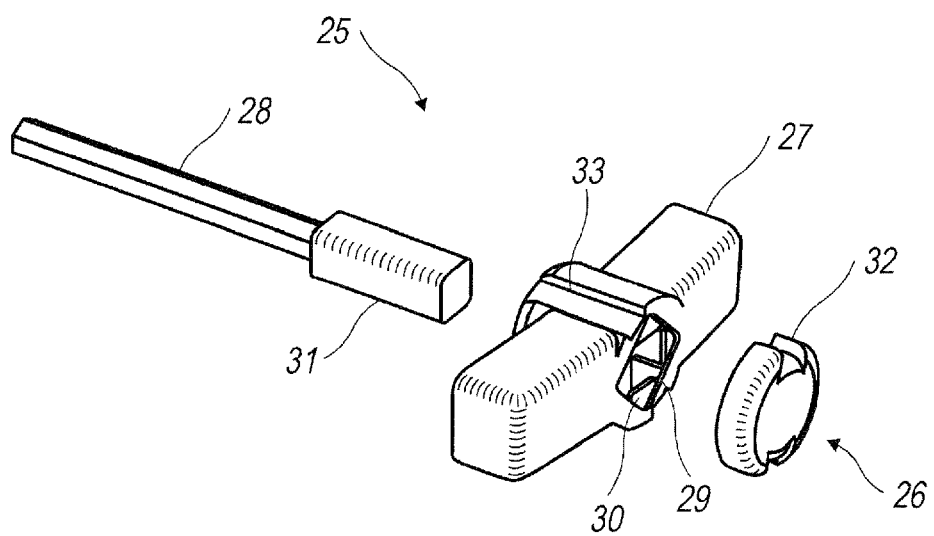
FIG. 8 is a perspective view of one embodiment of a disassembled socket key having an elastomeric deformation member.

A further torque indicator embodiment is shown in FIGS. 7-9. As can be seen in FIG. 7, a socket key 25 is engaged with fastening member 4 of the load carrier foot 1. A disassembled socket key 25 is shown in FIG. 8, having a socket cap 26, a socket handle 27 and the longitudinal socket axle 28. The socket handle 27 as shown in FIG. 8 is a winged structure having a central portion with two portions extending on either side to facilitate gripping. The socket handle 27 has a central aperture 29, which as shown is shaped as a square. A deformation member 30 is lined along the sides of the aperture 29. Preferably, the deformation member 30 is an elastomeric material such as natural or synthetic rubber, or alternatively a soft plastic which is capable of deformation. In the embodiment as shown, the deformation member is placed such that elastomeric material is in each corner of the aperture 29 thereby forming a new different square which makes up the aperture 29.

Although the shape of the aperture is a square in FIG. 8, in other embodiments it may have multiple sides, however the sides should be such that resistance is provided for the socket axle 28 when inserted therein. As indicated, in other embodiments, the shape of the aperture could be other than square, and furthermore the angles between the sides do not have to be 90 degrees. Any polygon shape would suffice that provides resistance for the socket axle 28. Additionally, the deformation member may have some portion in the aperture which is softer and differently shaped than the remaining portion. Accordingly, upon tightening, this softer portion would be forced into the shape of the opposite socket.

Although in the preferred embodiment, an elastomeric material is used as the deformation member 30, in some embodiments, a plastic material capable of deformation may be employed as the deformation member 30. The plastic material can be designed to plastically deform and once used, disposed of and replaced. Furthermore, if after one, or a number of uses, recalibration of the deformation member 30 can be conducted so that they can be re-used. In other embodiments, where the deformation member 30 does not return to original shape, if needed, recalibration of the deformation member 30 can be conducted so that they can be re-used. Additionally, the deformation member 30 can be replaceable, such that a single or limited number of uses can be accomplished prior to replacement.

The longitudinal socket axle 28 has the same shape and dimensions at least on one end 31 as the aperture 29 for insertion. The longitudinal socket axle 28 additionally has a portion along its axle which is in the shape of the internal hollow bore of fastening member 8 (preferably alien shaped), so that when inserted and turned, the fastening member will also be turned.

The socket cap 26 contains a marking, in the embodiment shown in FIG. 8, it takes the form of a cap indentation 32. Along the socket handle 27 is also a visible marking, namely indentation 33. When indentation 32 and 33 are aligned, it will serve as a visible signal that the fastening member has been fully tightened. Prior to being fully tightened, indentation 32 and 33 will not be aligned. Accordingly, an operator would understand by looking at the indentations 32 and 33 whether the fastener is fully tightened or whether further tightening should be done. Thus indentations 32 and 33 may be considered an indicator element which may provide a visible signal that the fastener is fully tightened. Other visible signals could be used, for example a color could be shown on the socket handle 27, as well as on the socket cap 26, and which when aligned, indicates that the fastener has been fully tightened. Other visible signals could be used such as different patterns of markings or colors in various arrangements and thereby indicating to the operator when the fastening member 8 has been fully tightened, and prior to being fully tightened.

Figures 9A, 9B:
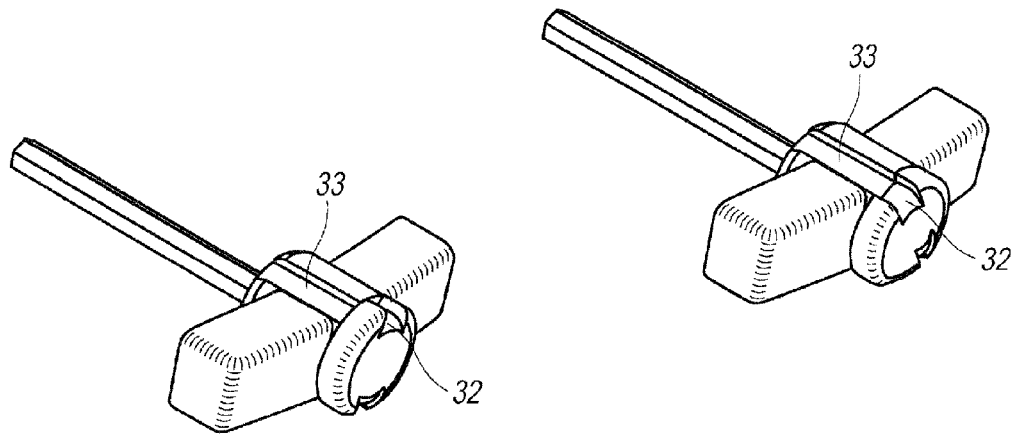
FIG. 9a is a perspective view of one embodiment of a socket key in a misaligned configuration.
FIG. 9b is a perspective view of one embodiment of a socket key in an aligned configuration.

When the socket key 25 is inserted into the fastening member 8, an operator may twist the socket key 25 by turning the socket handle 27. The longitudinal socket axle 28, due to the shape of end 31 inserted into the aperture 29, will place compressive force against the deformation member 30. The deformation member 24 is calibrated so that it will deform, allowing twisting of the socket handle relative to the socket axle 28. Furthermore, the deformation member 30 is calibrated such that upon a certain tightening force, the deformation member will allow turning of the socket handle until the indentation 32 is aligned with indentation 33 as shown in FIG. 9b. Therefore, upon turning of the fastening member and tightening thereof to a predetermined tightening force, the deformation member 30 will reach a predetermined calibrated compressive force thereby allowing turning of the socket handle and alignment of indentations 32 and 33, thus indicating to an operator that the load carrier 1 has been fully tightened.

In other embodiments, electronics could be employed to provide audio or visual signal. For example, upon turning of the socket key 25, two sides of an electrical connection could move into contact to complete a circuit. A speaker or sound producing element could make an audible noise signaling that that the load carrier 1 is fully tightened. Alternatively, or additionally, a light or LED could be connected with the circuit such that the light or LED would signal to an operator when the load carrier 1 is fully tightened. Moreover, in some embodiments, a button could be placed on the head portion 10 and connected with the electrical circuit so that when the load carrier is fully tightened, the button will extend out, or "pop", thereby contacting the operator's hand. This would also serve as a tactile signal to the operator that the device has been fully tightened.

Figure 10:
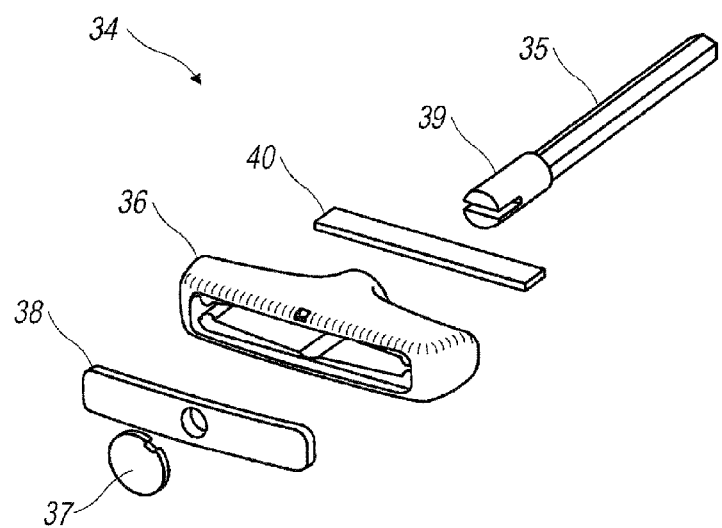
FIG. 10 is a perspective view of one embodiment of a disassembled socket key having a longitudinal biasing member.
Figure 11:
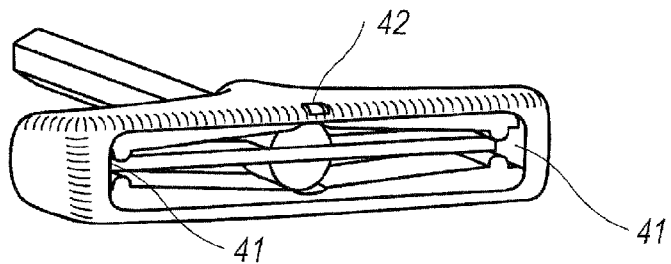
FIG. 11 is an overhead perspective view of one embodiment of an assembled socket key having a longitudinal biasing member.
Figure 12A:
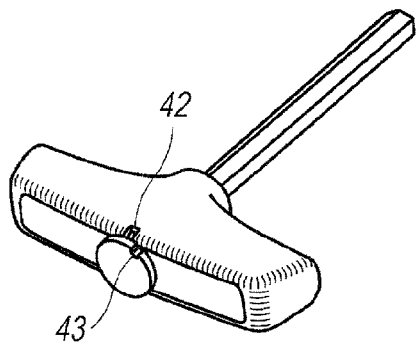
FIG. 12a is a perspective view of one embodiment of a socket key in a misaligned configuration.
Figure 12B:
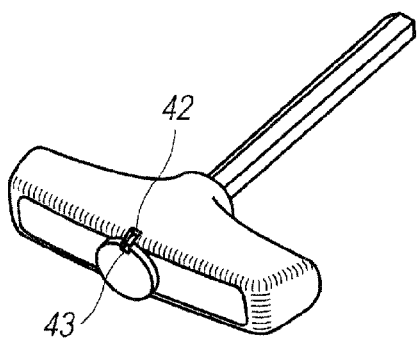
FIG. 12b is a perspective view of one embodiment of a socket key in an aligned configuration.
Figure 13:
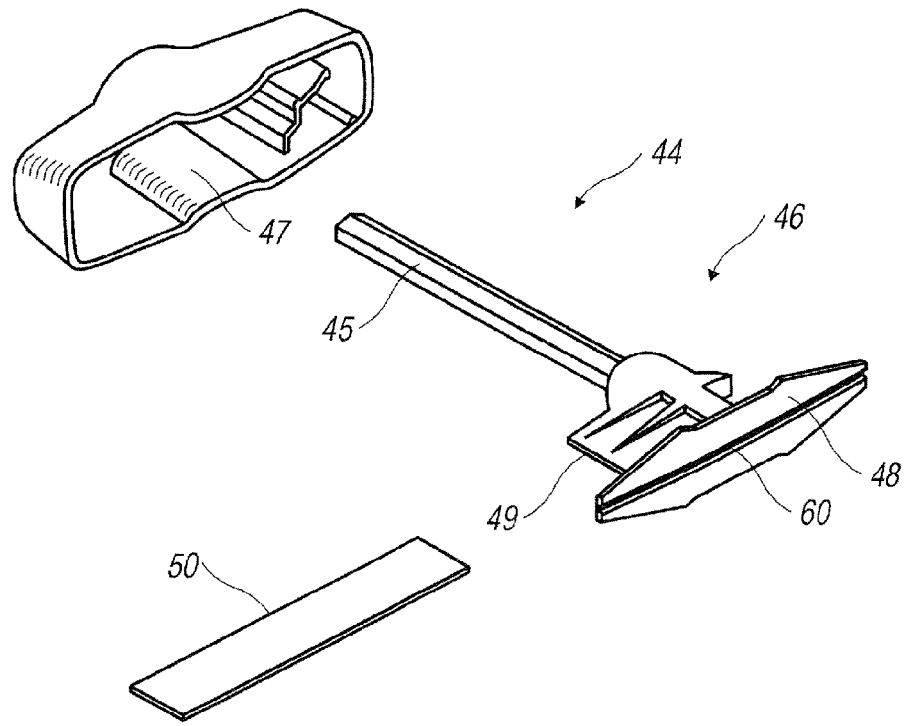
FIG. 13 is a perspective view of one embodiment of a disassembled socket key.

Additional torque indicator embodiments are shown in FIGS. 10-12. A disassembled socket key 34 is shown in FIG. 10, and which is made up of a longitudinal fastening axle 35 inserted into a handle 36 with a socket cap 37 located on top of cover 38 of the handle 36. The end of the fastening axle 35 which is inserted into the handle 36 additionally has a notch 39 for receiving a longitudinal biasing member 40. In the embodiment shown in FIG. 11, the longitudinal biasing member 40 has a rectangular and planar shape, and is inserted on its edge and extends across the width of the handle 36. In other embodiments the longitudinal biasing member can be shaped differently, however it should extend some length beyond the notch 39 on the fastening axle 35. Furthermore, each end of the longitudinal biasing member 40 can be held by biasing holders 41 in the handle 36.

When an operator inserts the socket key 34 into the fastening member 8 and turns the handle 36, the biasing holders 41 will apply a force against the ends of the longitudinal biasing member 40. This in turn will place a turning force on the notch 39, thereby causing the socket key 34 to turn. The longitudinal biasing member 40 is calibrated so that it will deform or "twist" such that when the force applied to the biasing member 40 is applied by biasing holders 41, the spring will turn while the notch 39 and the fastening axle 35 will either remain stationary or rotate more slowly than the handle 36 depending on the amount of force applied. Furthermore, a first visible marking 42 is placed on the cap as well a second visible marking 43 is placed on the handle 36. In the embodiment shown in FIGS. 11-14, the markings are colored indentations, however, it will be understood by those of skill in the art that other markings could be used, for example protrusions.

The first and second visible markings 42 and 43 are preferably misaligned when the fastening member 8 is not fully tightened as in FIG. 12a. As greater twisting force is applied to the socket key 34, the second visible marking 43 on the handle 39 will rotate towards alignment with the first visible marking 42 due to the deformation, or "twisting" of the longitudinal biasing member 40.

The longitudinal biasing member 40 is calibrated so that when force is applied to rotate the socket key 34, the biasing member 40 will twist allowing rotation of the socket handle relative to the fastening axle 35. The longitudinal biasing member 40 is calibrated such that upon a predetermined force applied to the ends of the longitudinal biasing member 40, it will twist causing the handle 36 to rotate to a point where the second visible marking 43 is aligned with first visible marking 42. Therefore, upon turning of the fastening member and tightening thereof to a particular tightening force, the biasing member 40 will reach a predetermined calibrated force thereby allowing turning of the socket handle 36 and alignment of visible markings 42 and 43, thus thereby forming a signal to the operator that the fastening member is fully tightened. Accordingly, visible markings 42 and 43 may be considered an indicator element which may provide a visible signal that the fastener is fully tightened.

In the embodiment shown in FIGS. 10-12 colored indentations are used, and their alignment or misalignment used to signal whether a desired tightening has been reached. However, it will be understood by those skilled in the art that there are multiple ways in which it could be signaled to the operator that the fastening member 8 is fully tightened. For example, more than two markings could be used or a particular pattern of markings could be used as a signal that the predetermined tightness has been reached.

However, due to the fact that load carrier foot devices are used in cold whether, it is of interest that the biasing member 40 behave similarly in different temperature environments; that is, both in typical hot and cold ambient conditions and climates. While a metal such as steel satisfy this criterion, there are others materials that may also fulfill this criterion, as well, such as certain plastics or composites.

In the preferred embodiment, the biasing member 40 is a modified cantilever beam where stress is placed on opposite ends and held by its middle portion. By this stress applied to the ends, the beam deform or "twist when subjected to these torsional forces as discussed above. Additionally, in other embodiments, a traditional torsion spring could also be employed as the biasing member. However, the calibration of forces to achieve the predetermined twisting of the biasing member will be different than that for a cantilever beam type spring.

Additional embodiments of a torque indicator are shown in FIGS. 13-16. As illustrated in the perspective view of FIG. 13, a socket key 44 is shown having a longitudinal fastening axle 45 with a biasing indicator head piece 46 contained within a handle 47. The biasing indicator head piece 46 is made up of a cover 48 attached to a winged receiver 49. A longitudinal biasing member 50 can be inserted on its edge into the head piece 46. In the embodiment shown in FIG. 13, the longitudinal biasing member 50 has a rectangular and planar shape, however, other suitable shapes may be employed. As can further be seen in FIG. 15, the biasing member 50 will be interposed within a notch 51a being snugly fit therein. Additionally, each end of the biasing member 50 will extend between and held by holders 51b. In the embodiment shown in FIG. 15, these holders are apertures on each end of the handle 47. However, in other embodiments the biasing element 50 need not extend from end to end of the handle, but may be spaced a distance in from the edges of the handles, along with holders 51b at each end of the biasing element 50.

Figure 14:
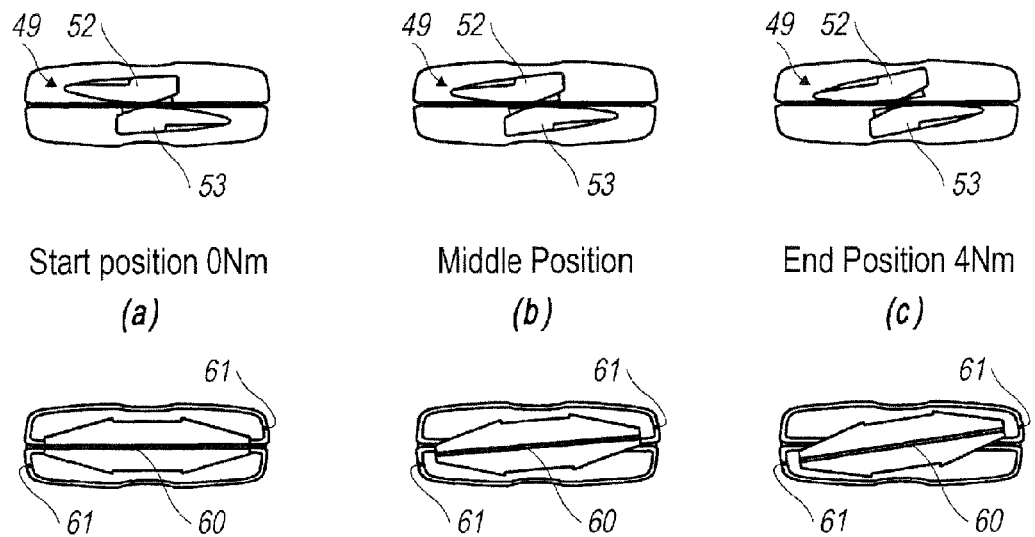
FIG. 14 illustrates several positions of rotation of a cover corresponding to the degree of applied torque.
Figure 15:
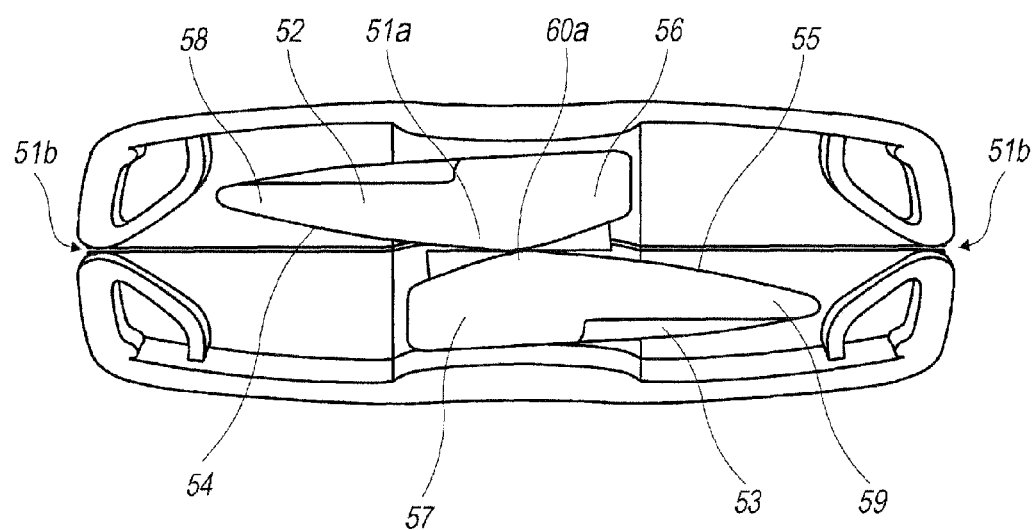
FIG. 15 is an overhead plan view of a winged receiver having a longitudinal biasing member fit therein.
Figure 16:
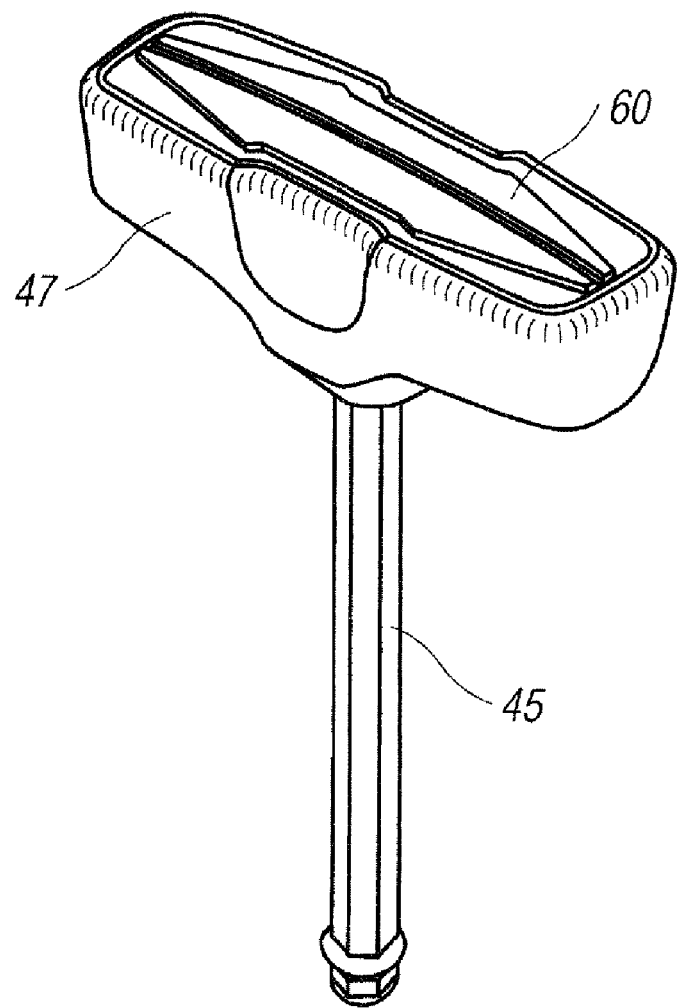
FIG. 16 is an overhead perspective view of one embodiment of a socket key with a winged receiver and longitudinal biasing member.

An overhead plan view of the winged receiver 49 is shown in FIG. 14 in positions (a), (b), and (c). The winged receiver can be comprised of two extended portions 52 and 53, separated by notch 54. Preferably, each portion is symmetrically disposed one on each side of the biasing member 50. Each extended portion 52 and 53 will have a contact surface 54 and 55 which will engage the biasing member 50. Furthermore, in the embodiment shown in FIGS. 15-16, each of the contact surfaces 54 and 55 have a concave arcuate shape, which curve from base ends 56 and 57 of the extended portions 52 and 53, to narrow ends 58 and 59, respectively. The narrow ends 58 and 59 symmetrically extend toward opposite ends of the biasing member 50 to an equal degree from the center point 60a of the biasing member 50. The narrow ends 58 and 59 do not reach the end of the biasing member 50 but are spaced a distance from these ends of the biasing member 50 to an equal degree, thus maintain symmetry. The extended portions 52 and 53 may overlap one another on each side of said biasing member 50 to an equal degree longitudinally from the center point of the biasing member 50.

Accordingly, when an operator turns the handle 47, the holders 51b will impose a turning force to each end of the biasing member 50. The biasing member will then in turn apply a turning force on each of the contact surfaces 54 and 55 of the winged receiver 49. As the winged receiver is attached to the fastening axle 45, this will cause rotation of the fastening axle and further to the fastening member 8 into which it is inserted.

The biasing member 50 is calibrated so that it will deform in the direction which the extended portions 52 and 53 rotate and urge in dependence on the amount of force applied. Furthermore, as greater force is applied, the biasing member will deform or "bend" to a greater degree across the contact surfaces 44 and 45 of the extended portions 42 and 43. The curvature of surfaces 54 and 55 allows a more efficient distribution of forces across these surfaces by the biasing member 31 for stress reduction. The holders 51b allow the ends biasing member 50 to slide allowing the deformation of the biasing member.

As the biasing member 50 is urged against extended portions 52 and 53, the biasing member will bend, allowing extended portions 52 and 53 to rotate with respect to the handle, and this will in turn cause the cover 48 to rotate as well relative to the handle. The cover 48 has a middle indentation 60 longitudinally across the center of the cover 48 serving as a visible marking. Additionally, the handle 47 has a visible marking 61 off-center from the middle indentation 60. When the middle indentation 60 and visible marking 61 are aligned, it will serve as a visible signal to an operator that the fastener 8 is fully tightened. The biasing member 50 is calibrated such that at a particular predetermined tightening force applied by the operator, the biasing member will bend with a degree such that the portions 52 and 53 will rotate along with the cover 48 such that the middle indentation 60 and visible marking 61 will be aligned.

The rotation of the portions 52 and 53 along with the cover 48 is shown in FIG. 14 in positions (a), (b), and (c). As shown in position (a), no force is applied (or no force sufficient to deform the biasing member 50), and accordingly, the biasing member has not begun to bend, and accordingly, the cover 48, nor portions 52 and 53, have rotated. However, in position (b) some torque has been applied to rotate the fastener 8 sufficient to cause the biasing member 50 to bend and portions 52 and 53 to rotate. Furthermore, as may be appreciated, as the biasing member 50 bends, there is a larger area of contact spread across the contact surfaces 54 and 55 thereby more efficiently dispersing force associated therewith. Accordingly, the indentation 60 on the cover 48 has moved off-center, yet is not aligned with visible marking 61. This would server to signal to an operator that the load carrier foot is not yet fully tightened.

Position (c) shows that the portions 52 and 53 are more fully engaged with the biasing member 50 and that the indentation 60 on the cover 48 is aligned with the marking 61 on the handle 47. This serves as a signal to an operator that the load carrier is fully tightened. Furthermore, the biasing member 50 is calibrated such that the force required to deform it across portions 52 and 53 such that the indentation 60 and marking 61 are aligned, occurs when the fastener is fully tightened to a predetermined amount. In other embodiments there may be other markings, colors or indentations in various colors used to signal to the operator that the load carrier is fully tightened. For example, the indentation 60 may instead be a colored sticker, or may be a notch at the edge of the cover 48.

Moreover, it should be noted that after the operator is signaled that the predetermined tightness has been reached, the operator may still choose to continue tightening the fastening member 8. The biasing indicator head piece 46 with the biasing member 50 does not act to prevent further tightening. Accordingly, an operator could continue tightening until indentation 60 has rotated past marking 61.

In the preferred embodiment, and as shown in FIGS. 13-16 the indicator elements, including the aligned visible markings 61 and a portion of middle indentation 60, are viewable toward the longitudinal ends of the device handle. This placement towards the longitudinal ends of the handle is different from the placement somewhat more toward the middle of the socket handle immediate location of near the hub as shown in the indicators in FIGS. 7-12. In other embodiments, at least a portion of any visible markings or signal are toward the outer edges of the handle. The placement towards the end of the hand has the advantage that the indicator is not covered by the installer's hand during tightening rendering it more difficult to see when the appropriate torque is reached.

Furthermore, in preferred embodiments, the biasing member 50 is a steel spring, however, other similarly suited materials and biasing mechanisms can also be employed. However, due to the fact that load carrier foot devices are used in cold whether, it is of interest that the biasing mechanism behave similarly in different temperature environments; that is, both in typical hot and cold ambient conditions and climates. While metals such as steel satisfy this criterion, there are others that also fulfill, as well.

Furthermore, the degree to which the biasing member 50 bends under stress is highly dependent on the thickness of the member. The particular size and thickness of the biasing member is also dependent on the size of the torque indicator. The following described embodiments for the dimensions of the biasing member are for an indicator handle that is about 20 mm by 50 mm. Accordingly, in some embodiments, the thickness will be from 0.5 mm to 1.2 mm, in more preferred embodiments, from 0.6 to 1.1, still further embodiments, 0.7 mm to 1.0 mm, and most preferred is from 0.7 mm to 0.8 mm. Furthermore, the length of the biasing member 50 is preferably from 48 mm to 54 mm, in more preferred embodiments, from 49 mm to 53 mm, still further embodiments, 50 mm to mm, and more preferred is 51 mm, and most preferred is 51.4 mm. The width of the biasing member 50 is from 8 mm to 12 mm, and in still further embodiments, 9 mm to 11 mm, and in a most preferred embodiment, 10 mm. As the size of the handle increases or decreases, the thickness, length and width may be increased and decreased to achieve a desired torque at which the biasing member 50 bends under stress. For example, the desired torque at which the load carrier or other sports device is fully tightened may be targeted at 2 Nm, 4 Nm, 6 Nm, or 8 Nm. The dimensions of the biasing member (i.e. thickness, length and width) can be adjusted to achieve the desired torque.

In another embodiment, the signal for showing the load carrier foot is fully tightened can be provided by placing electrical contacts proximate the biasing member 50 such that upon twisting of the biasing member 50 to a certain degree, the electrical contacts are closed. For example, when the desired predetermined torque is reached, the biasing member is twisted due to force being applied such that the electrical contacts proximate biasing member are closed. This causes the electrical circuit to be complete. A light, LED, or alarm could be connected with the circuit thereby providing signal either visually or audibly. Therefore, when insufficient torque is applied, an operator will know that the fastener is yet tightened, and furthermore, when the audio or visual signal is effectuated, the operator will have been informed that the fastener is fully tightened. The visible signal can be a light, or blinking light, or LED and can exterior to the housing 11 or shown in the window 20. If an audio signal is used a speaker can be used either within the housing 11 or exterior to the housing for providing the signal. Moreover, in some embodiments, a button could be placed on the handle 47 and connected with the electrical circuit so that when the load carrier is fully tightened, the button will extend out, or "pop", thereby contacting the operator's hand. This would also serve as a tactile signal to the operator that the device has been fully tightened.

Figure 17:
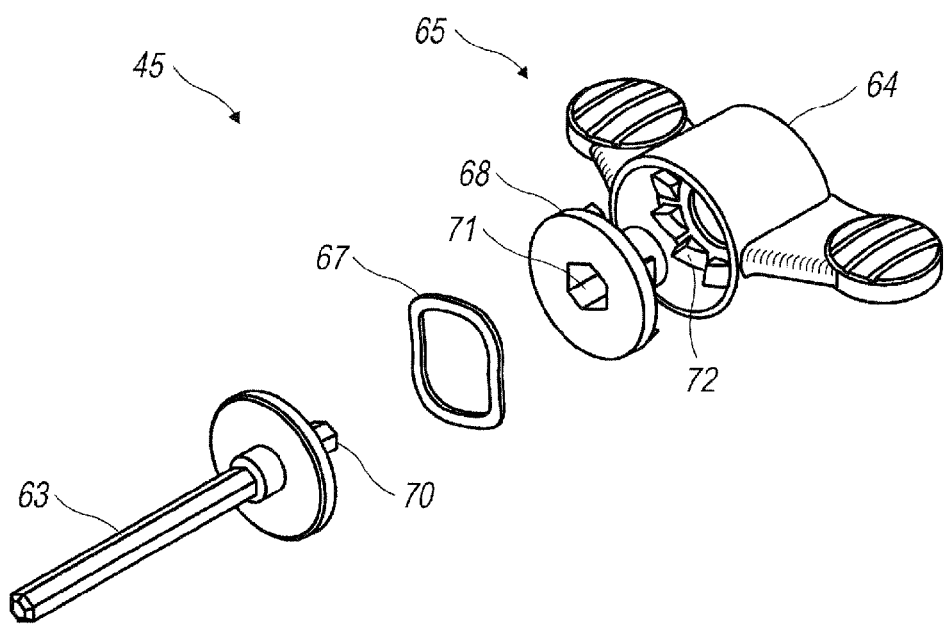
FIG. 17 is a perspective view of one embodiment of a disassembled socket key having a collapsible biasing member.
Figure 18:
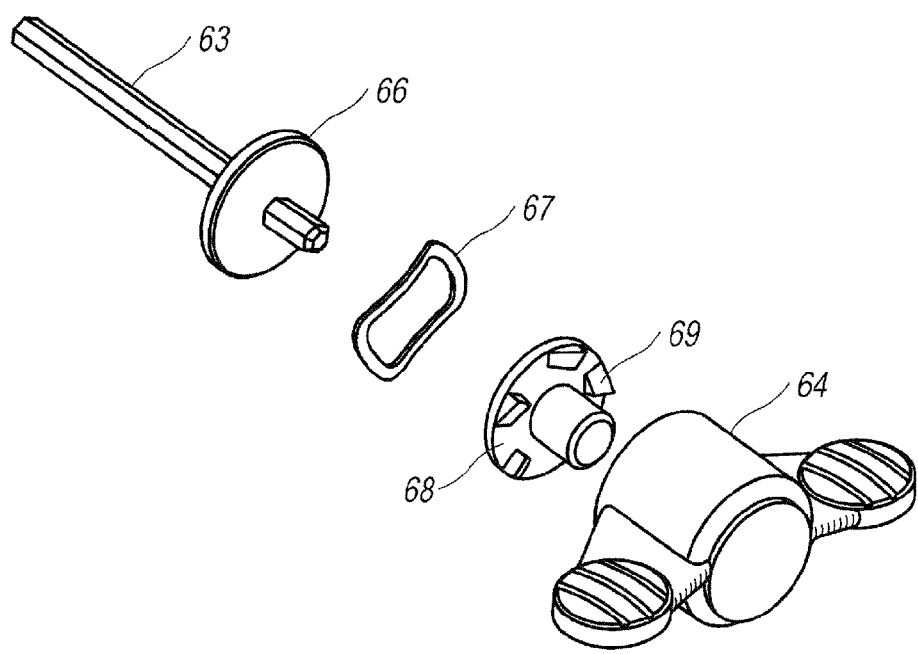
FIG. 18 is a perspective view of one embodiment of a disassembled socket key having a collapsible biasing member.
Figure 19:
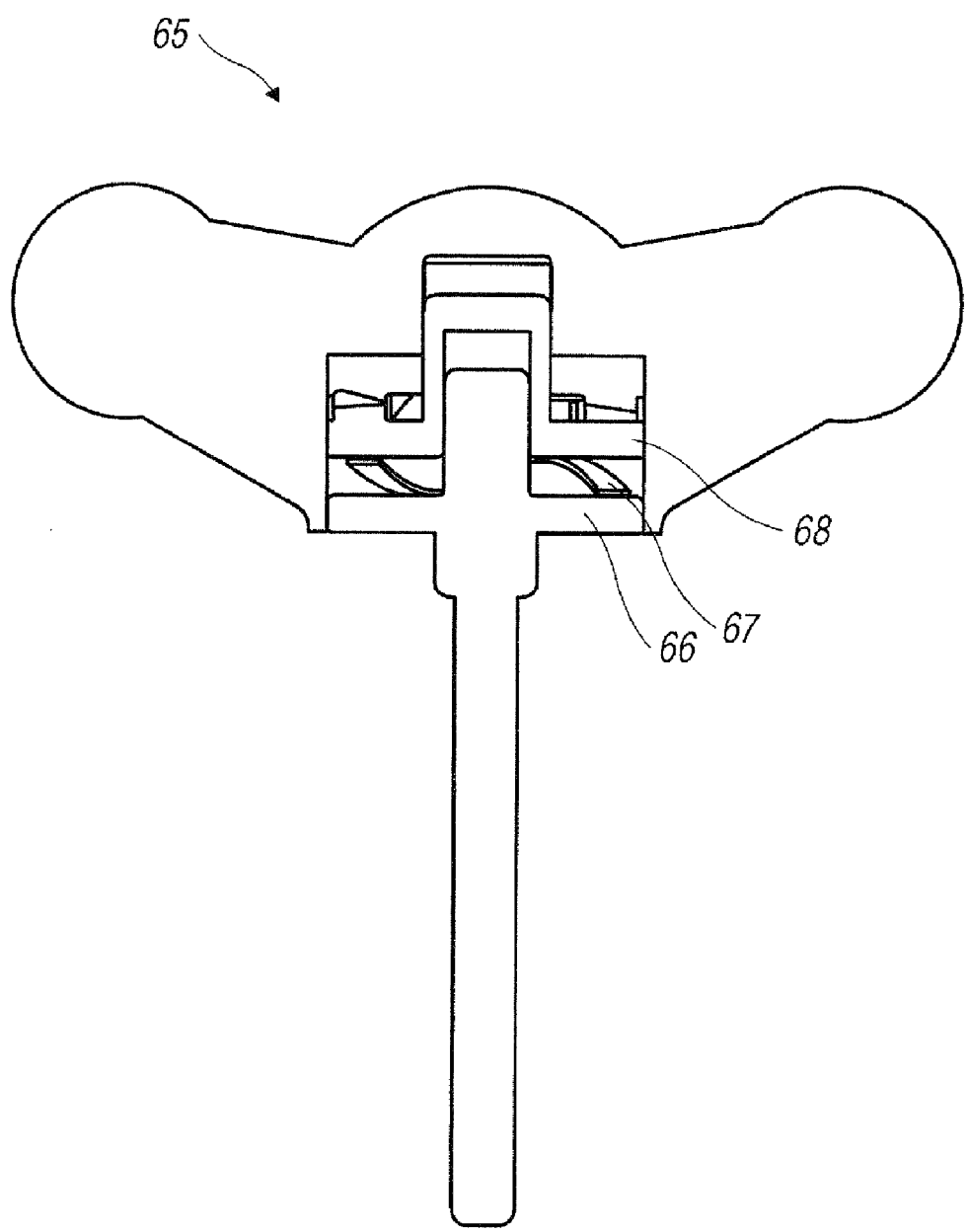
FIG. 19 is a side view one embodiment of an assembled socket key having a collapsible biasing member showing internal components thereof

Further embodiments of a torque indicator are shown in FIGS. 17-19. A disassembled socket key 532 is shown in FIGS. 17 and 18 which has a longitudinal fastening axle 63 with an indicator head piece 64 at one end contained within a handle 65. The indicator head piece 64 has a blocking platform 66 which supports a collapsible biasing member 67, which in the embodiment shown is a wave spring. Resting on the biasing member 67 is a force receiving member 68. As illustrated in FIG. 19, on the upper side of the force receiving member 68 are upward projecting ramped teeth 69. The end 70 of the axle 63 is received by an aperture 71 in the force receiving member 68, and is shaped such that it will turn with the force receiving member 68. Such shape is preferably according to allen key shape. Internal to the handle 65, and positioned above the force receiving member 68, are underside ramped teeth 72. The underside ramped teeth 72 may be fully integrated with the handle 65, or may be contained on an additional platform which rotates with the handle 65.

When fully assembled, the upward projecting ramped teeth 69 of the force receiving member 68 will oppose the underside ramped teeth of the handle 65 and furthermore each will be faced in the opposite direction of the opposing ramps. For example, if the handle will be turned clockwise for tightening, the underside ramps 72 will ascend from the handle in the counterclockwise direction and the upward projecting ramped teeth 69 will ascend in the clockwise direction. Thus, the ramped portions of the opposing ramped teeth will oppose one another as shown in FIG. 19. The force receiving member 68 may have at least one ramped teeth 69, preferably two or more, from three to twenty, and most preferably five. The handle can have the same number of underside ramped teeth 72, at least one, preferably two or more, from three to twenty, and most preferably ten.

According to the above, when the handle 65 is turned by an operator, the ramped surfaces will oppose one another causing the force receiving member 68 to turn along with the handle 65. The incline of the ramped surfaces provides the resisting force so that both the force receiving member 68 and handle 65 turn together. The biasing member 67 is calibrated to hold the force receiving member 68 above the platform 66 at least the height of the upward projecting ramped teeth 69 or underside ramped teeth 72 when there is no torque applied to the handle 65. If one group of ramps has a greater height than the other, then the biasing member should hold the force receiving member 68 above the platform 66 a distance equal to the taller set of ramps. Additionally, when torque applied to turn the handle 65 is increased, the biasing member will collapse with greater degree due to the increased compressive force applied by the underside ramped teeth 72. The biasing member 67 is calibrated such that when a predetermined torsion is applied to the handle, for example when the load carrier foot has been tightened fully to a predetermined degree, the biasing member 67 will collapse due to the force imposed by the underside ramped teeth 72, and will collapse to a degree where the underside ramped teeth 72 will slide over the ramped upward projecting ramped teeth 69. When the underside ramped teeth 72 slide over the upward projecting ramped teeth 69, the torque applied to the handle 65 fails to be transferred to the force receiving member 68 and thus the fastening member 8 in the load carrier foot would not be further tightened.

Furthermore, after the underside ramped teeth 72 slide over the upward projecting ramped teeth 69, the force receiving member 68 will snap back against the underside of the handle 65. As a consequence of this action, an audible noise is produced, which generally will be a "clicking" sound, and can be heard by the operator. Thus, when this occurs, the handle 65 will be rotated without further tightening the fastening member 8 while at the same time hearing a "clicking" sound. Thus, the sound will serve as an audible signal to the operator indicating that the load carrier foot has been fully tightened. Furthermore, the sliding action of the opposing ramped teeth will prevent an operator from over-tightening the load carrier foot, thus preventing any potential damage to the assembly.

In addition to the audible "clicking" sound, there may also be a tactile signal to the operator. As the underside ramped teeth 72 slide over the upward projecting ramped teeth 69, and the force receiving member 68 snap back against the underside of the handle 65, this will also cause vibration to resonate through the handle 65 which the operator will feel. Accordingly, this acts as a tactile signal to the operator that the load carrier foot has been fully tightened. Accordingly, the ramped teeth 72 slide over the upward projecting ramped teeth 69 can be considered indicator elements which may provide a signal that the load carrier foot is fully tightened.

Figure 20:
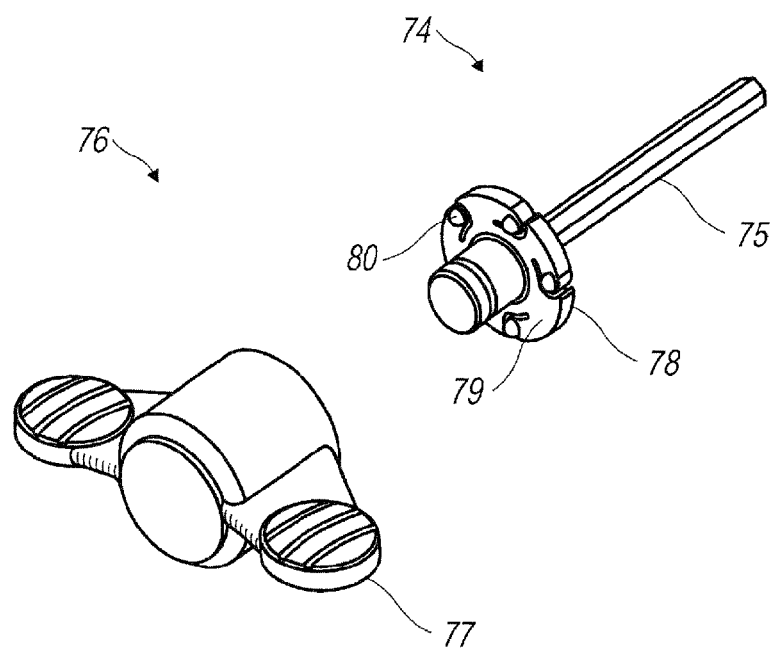
FIG. 20 is a perspective view of one embodiment of a disassembled socket key having cantilever springs with a raised dome.
Figure 21:
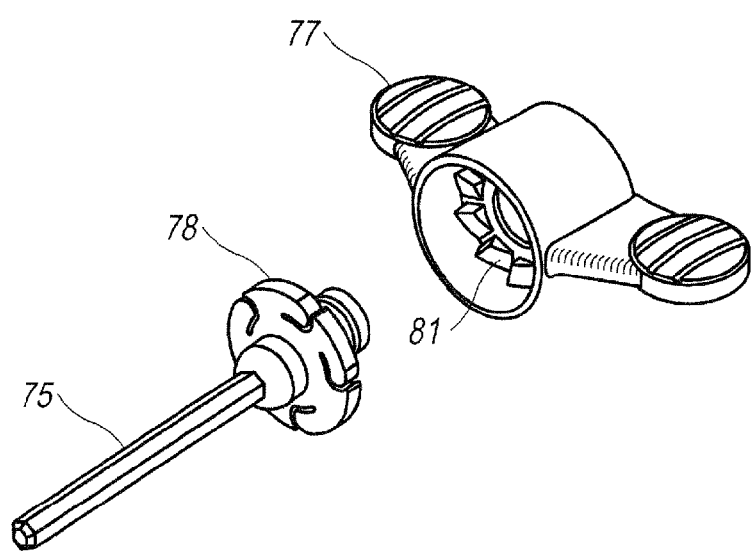
FIG. 21 is a perspective view of one embodiment of a disassembled socket key having cantilever springs with a raised dome.
Figure 22:
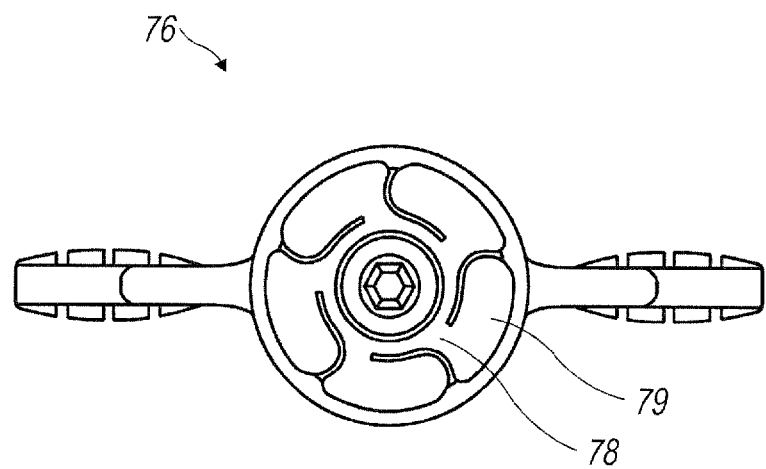
FIG. 22 is an underside view of a socket key having cantilever springs with a raised dome.

Additional embodiments of a torque indicator are illustrated in FIGS. 20-22. In FIG. 20 a socket key 74 is displayed with a longitudinal fastening axle 75 that has an indicator head piece 76 at one end contained within a handle 72. The indicator head piece has a platform 78 with multiple cantilever springs 79 each having a raised dome 80 near the end thereof. The handle 77 will have underside ramped teeth 81 which oppose the platform 78.

The platform 78 may have at least one cantilever spring 79, preferably two or more, more preferably from three to twenty, and most preferably, five. The handle can have the same number of underside ramped teeth 81, at least one, preferably two or more, from three to twenty, and most preferably, ten.

As the handle 77 is rotated to tighten the fastening member 8, and when the socket key 74 is inserted therein, the underside ramped teeth 81 will be urged against the domes of the cantilever springs 79. When lower torque is required to turn the fastening member 8, the underside ramped teeth 81 after being urged against the raised domes 80 will force rotation of the platform 78 which in turn will rotate the longitudinal fastening axle 75 and fastening member 8. The cantilever springs 79 are calibrated to deflect at a particular force imposed by force of the ramped teeth 81 urging against the raised domes 80 thereby lowering the raised domes 80. At a particular predetermined tightening force applied to the handle 77, the cantilever springs 79 will fully deflect causing the raised domes 80 to lower to a sufficient degree that the ramped teeth 81 are allowed to slip over the raised domes. Consequently, the torque applied to the handle 77 fails to be transferred to the platform 78 and in turn to the fastening member 8 in the load carrier foot which will not be further tightened. In this way the handle can be rotated without further tightening the load carrier foot.

Accordingly, after slipping past the raised domes, a "clicking sound" will serve as an audible signal to the operator that the fastening member 8 has been fully tightened in the load carrier foot. Additionally, as a consequence of ramped teeth 81 slipping past the raised domes 80, vibrations will resonate through the handle 72 which would be felt by an operator, thus serving as a tactile signal that the fastening member 8 has been fully tightened. Furthermore, the sliding action of the opposing ramped teeth will prevent an operator from over-tightening the load carrier foot, thus preventing any potential damage.

Figure 23:
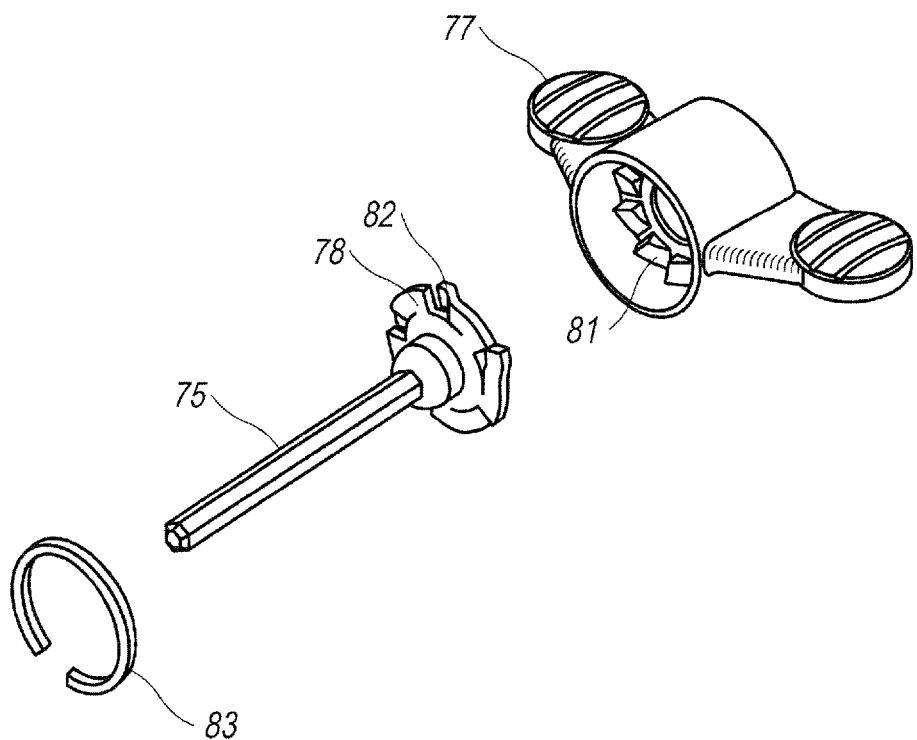
FIG. 23 is a perspective view of one embodiment of a disassembled socket key having cantilever springs with raised biasing portions.
Figure 24:
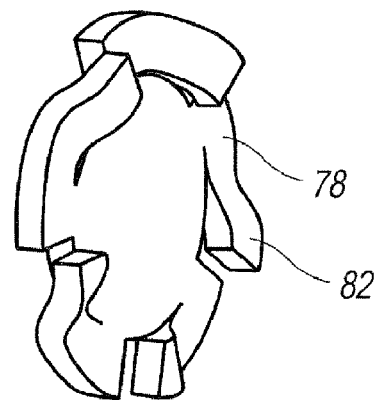
FIG. 24 is a perspective view of one embodiment of a platform having cantilever springs with raised biasing portions.
Figure 25:
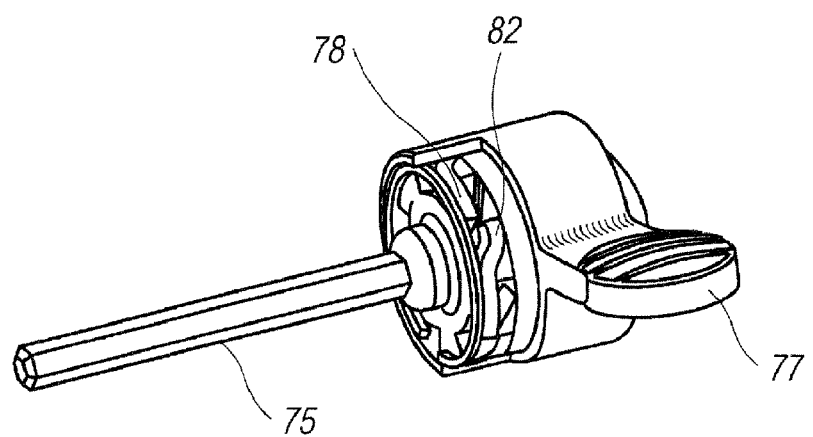
FIG. 25 is a perspective view one embodiment of an assembled socket key having cantilever springs with raised biasing portions showing internal components thereof.

In another embodiment shown in FIGS. 23-25, the platform 78 may have raised biasing portions 82 instead of cantilever springs 79 with raised domes 80. The raised biasing portions 82 may be raised portions of the platform 78 with spaces between each biasing portion 82. Furthermore, a retaining ring 83 can be used to maintain stability of the platform 78. In the same manner as the cantilever springs 79, when the handle 77 is turned, the underside ramped teeth 81 will be urged against the raised biasing portions 82.

The platform 78 may have at least one raised biasing portion 82, preferably two or more, from three to twenty, and most preferably five. The handle can have the same number of underside ramped teeth 81, at least one, preferably two or more, from three to twenty, and most preferably ten.

When lower torque is required to turn the fastening member 8, the underside ramped teeth 81 after being urged against the raised biasing portions 82 will force rotation of the platform 78 which in turn will rotate the longitudinal fastening axle 75 and fastening member 8. The raised biasing portions 82 are calibrated to deflect at a particular force imposed by force of the ramped teeth 81 urging against the raised biasing portions 82 thereby lowering the raised biasing portions 82. At a particular predetermined tightening force applied to the handle 77, the raised biasing portions 82 will fully deflect causing the raised biasing portions 82 to lower to a sufficient degree allowing the ramped teeth 81 to slip over the raised biasing portions 82. Consequently, the torque applied to the handle 77 fails to be transferred to the platform 78 and in turn to the fastening member 8 in the load carrier foot which will not be further tightened. Accordingly, the handle can be rotated without further tightening the load carrier foot.

Accordingly, after slipping past the raised biasing portions 82, a "clicking sound" will be serving as an audible signal to an operator that the fastening member 8 has been fully tightened in the load carrier foot. Additionally, as a consequence of ramped teeth 81 slipping past the raised biasing portions 82, vibrations will resonate through the handle 72 which would be felt by an operator, thus serving as a tactile signal that the fastening member 8 has been fully tightened. Furthermore, the sliding action of the opposing ramped teeth will prevent an operator from over-tightening the load carrier foot, thus preventing any potential damage.

In the preferred embodiment, the platform 78, raised biasing portions 82 as well as cantilever springs 79 with raised domes 80 are constructed from material that will have a similar deflection in both cold and hot temperatures and climates. While a metal such as steel satisfy this criterion, there are others materials that may also fulfill this criterion, as well, such as certain plastics or composites.

Figure 26:
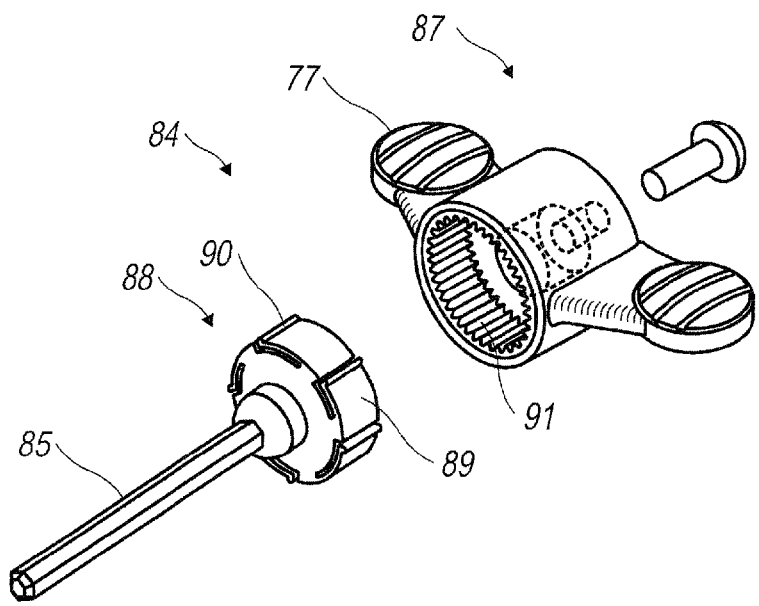
FIG. 26 is a perspective view one embodiment of a disassembled socket key having side cantilever biasing extensions.
Figure 27:
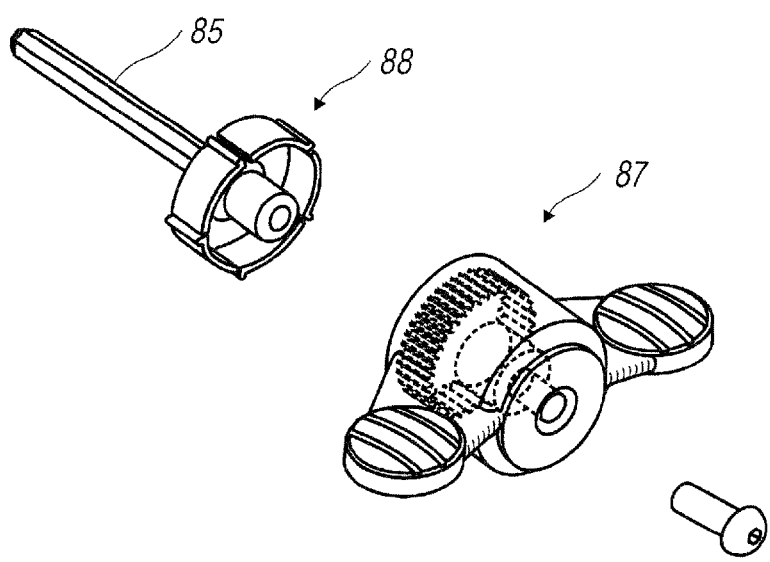
FIG. 27 is a perspective view of one embodiment of a disassembled socket key having side cantilever biasing extensions.
Figure 28:
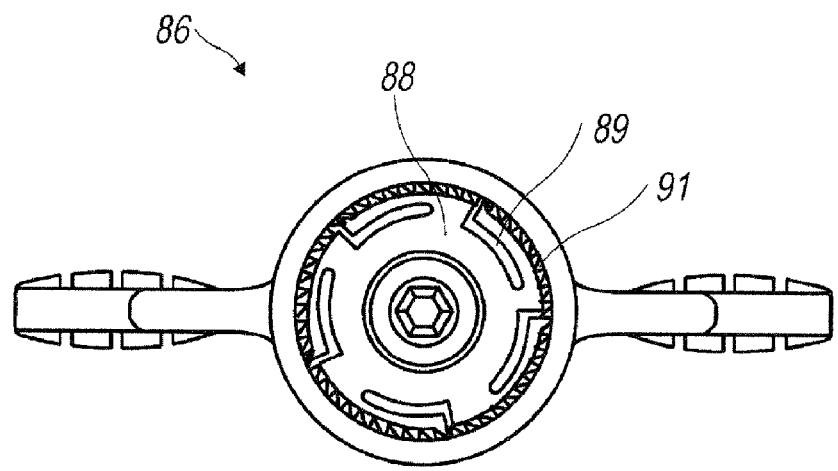
FIG. 28 is a underside view of one embodiment of an assembled socket key having side cantilever biasing extensions.

A further embodiment of a torque indicator is shown in FIGS. 26-28. FIG. 26 illustrates a disassembled socket key 84 having a longitudinal axle 85 with an indicator head piece 86 at one end contained within a handle 87. The indicator head piece has a platform 88 with side cantilever biasing extensions 89 with end ramps 90 at the end of each. The side cantilever biasing extensions are positioned around the outer sides of the platform 88. The handle 87 will have ramped side teeth 91 positioned its inner side surface which oppose the side cantilever biasing extensions 89.

The platform 88 may have at least one cantilever biasing extension 89 preferably two or more, from three to twenty, and most preferably five. The handle can have the same number of ramped side teeth 91, however there is preferably a multiplicity of such ramped side teeth 91, for example, greater than 20.

As the handle 87 is rotated to tighten the fastening member 8 when the socket key 84 is inserted therein, the ramped side teeth 91 will be urged against the end ramps 90 of the cantilever biasing extensions 89. When lower torque is required to turn the fastening member 8, the ramped side teeth 91, after being urged against the end ramps 90, will force rotation of the platform 88 which in turn will rotate the longitudinal fastening axle 85 and fastening member 8. The cantilever biasing extensions 89 are calibrated to deflect at a particular force imposed by force of the ramped side teeth 91 urging against the end ramps 90 thereby lowering the end ramps 90. At a particular predetermined tightening force applied to the handle 87, the cantilever biasing extensions 89 will fully deflect at a particular predetermined force, thereby causing the end ramps 90 to bend inward towards the central axis of the platform to a sufficient degree allowing the ramped side teeth 91 to slip over the end ramps 90. Consequently, the torque applied to the handle 87 fails to be transferred to the platform 88 and further to the fastening member 8 in the load carrier foot which will not be further tightened. Accordingly, the handle 87 can be rotated without further tightening the load carrier foot.

Accordingly, after slipping past the end ramps 90, a "clicking sound" will serve as an audible signal to an operator that the fastening member 8 has been fully tightened in the load carrier foot. Furthermore, the sliding action of the ramped side teeth 91 will prevent an operator from over-tightening the load carrier foot, thus preventing any potential damage.

In the preferred embodiment, the platform 88 and side cantilever biasing extensions 89 with end ramps 90 are constructed from material having similar deflection in both cold and hot temperatures and climates. While a metal such as steel satisfy this criterion, there are others materials that may also fulfill this criterion, as well, such as certain plastics or composites.

The platform 88 may have at least one side cantilever biasing extension 88, preferably two or more, more preferably from three to twenty, and most preferably five. The handle can have the same number of ramped side teeth 91, however there is preferably a multiplicity of such ramped side teeth 91, for example more than 20.

In some embodiments the socket key employed for fastening can be modified so that it remains installed during normal usage of the load carrier foot. In these embodiments, there are two configurations in which the socket key is placed. As an example of a load carrier in which the socket key 92 can have these two configurations, reference is made to the load carrier foot 93 shown in FIGS. 29 (*a*) and (*b*). As discussed previously with respect to the load carrier foot 1 in FIGS. 2 and 3, immediately within aperture 9, the hollowed fastening member 8 will preferably have an internal receiving structure 19 shaped to allow a socket key with reciprocating structure (for example alien shaped) to be inserted therein for turning. These components are also in the load carrier foot 93. The socket key 92 to be inserted into the fastening member 8 can have a first configuration where the socket key is pulled out partially from the fastening member 8's internal bore hole, which is shown in (a) of FIG. 29. In this first configuration, the socket key 92 can be more easily grasped by an operator and turned to tighten the fastening member 8. The socket key 92 can also be placed in a second configuration as shown in (b) of FIG. 29. In this second configuration the socket key socket key 92 is inserted all the way in the fastening member 8 for storage. Accordingly, the advantages of providing these two socket key configurations are that the fastening tool will remain with the foot at all times and will not need to be independently stored or remembered.

Figure 29A:
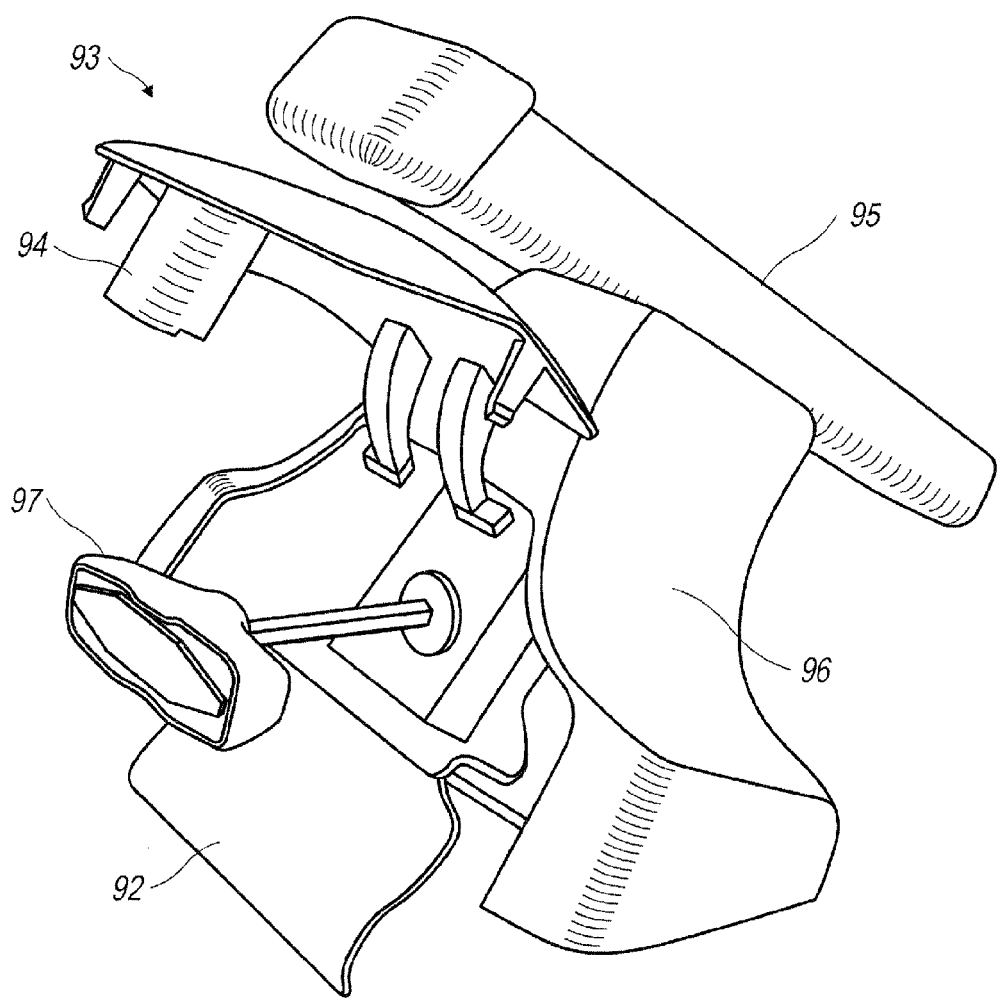
FIG. 29 is a perspective view of one embodiment of the socket key in a first configuration and a second configuration.
Figure 29B:
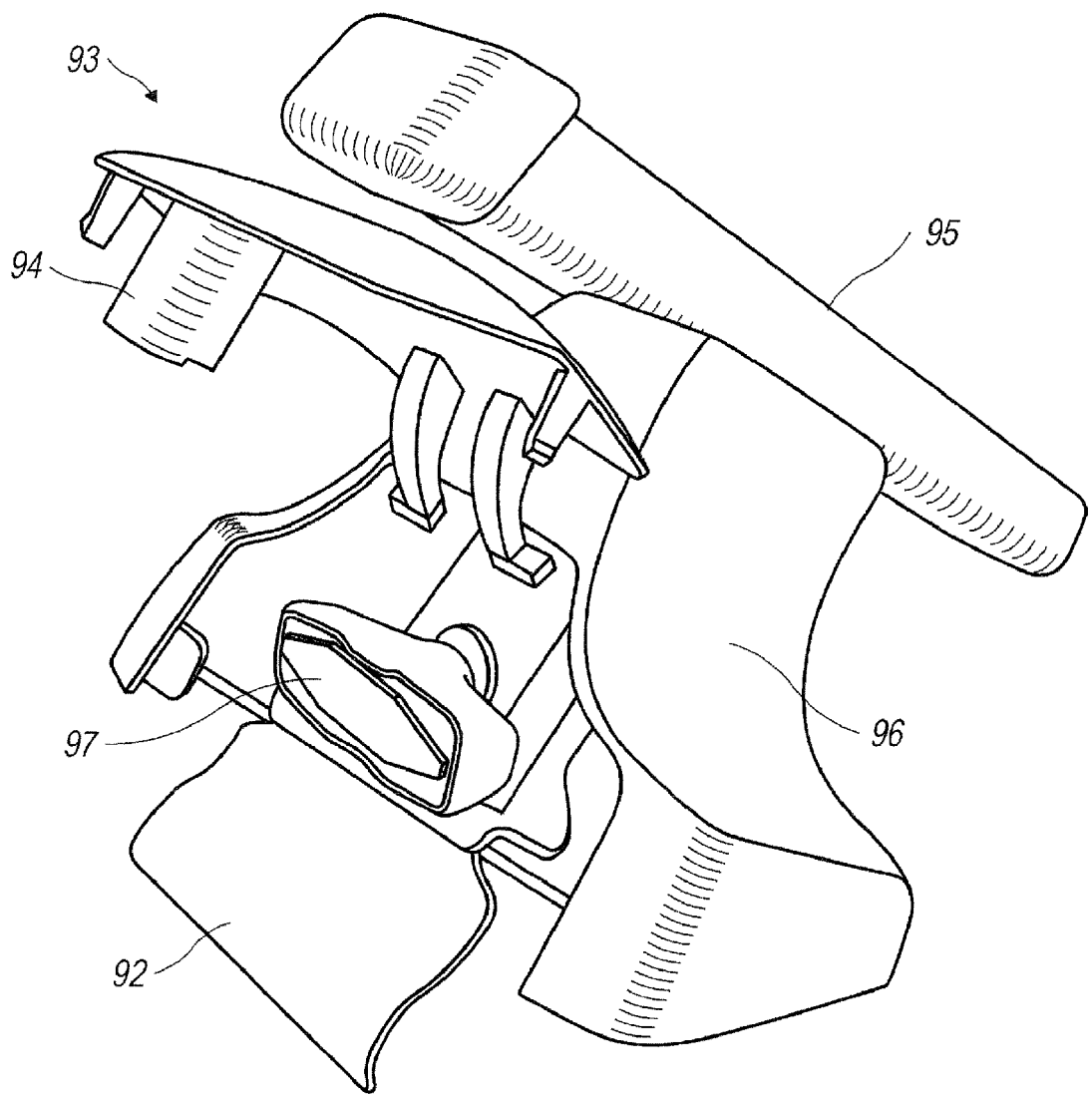
Figure 30:
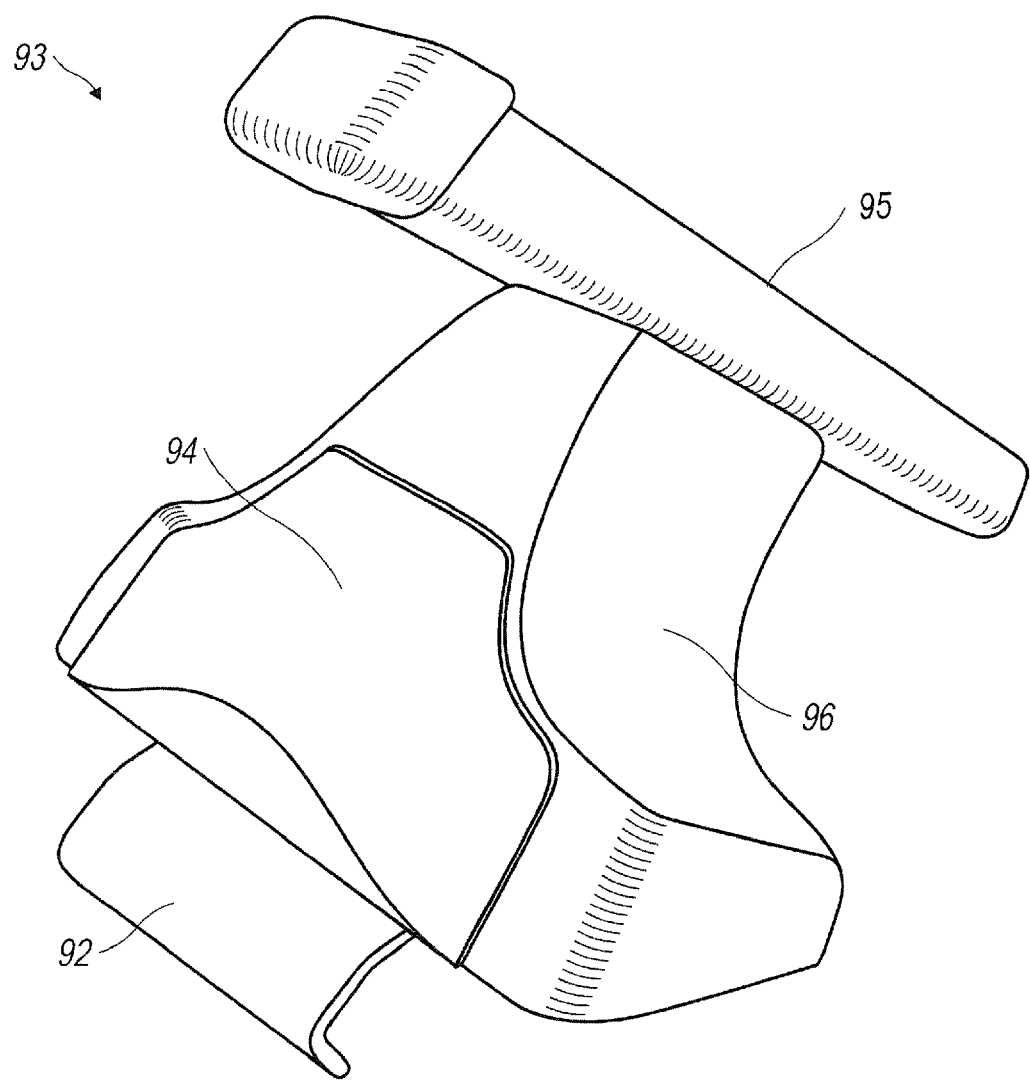
FIG. 30 is a perspective view of one embodiment of a load carrier foot with housing enclosing the internal components.

Furthermore, as shown in FIG. 29 in (a) and (b) is the load carrier housing door 94 cross bar connecting member 95. The housing door 94 may be opened in order to provide access to the socket key 92. However, as shown in FIG. 30, when the socket key 92 is placed in the second configuration, the housing door 94 may be closed. Also shown in FIG. 30 is load carrier housing 96 which houses the internal components of the load carrier foot 93.

Figure 31:
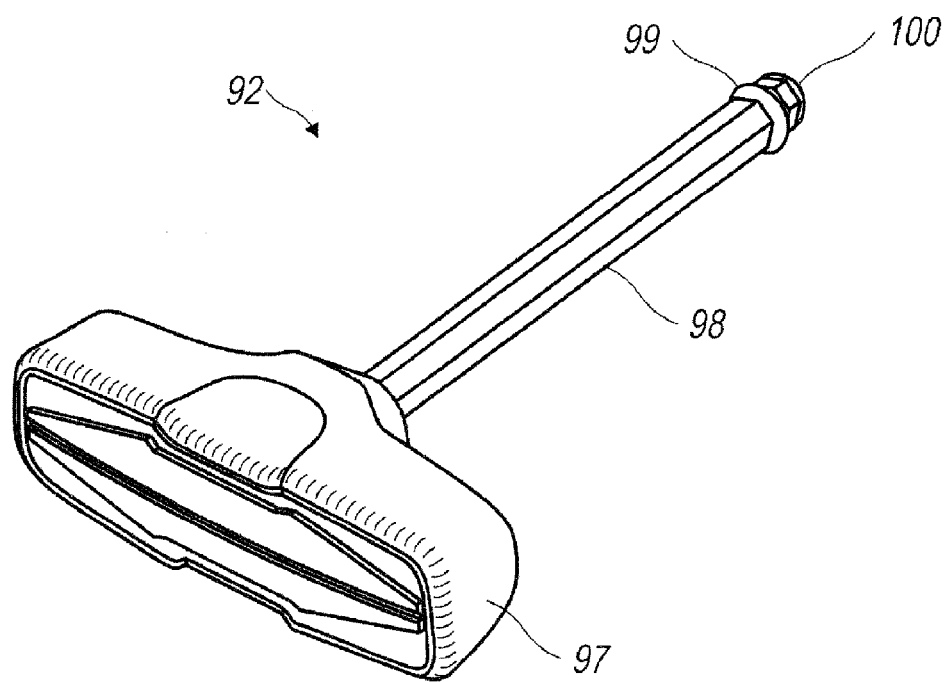
FIG. 31 is a perspective view of one embodiment of the socket key

For the first and second configurations as shown in (a) and (b) of FIG. 29, the socket key 92 as illustrated in FIG. 31 may be used. The socket key 92 can have a handle 97, which may have a torque indicator of one of the embodiments according to the invention described herein (for example, the embodiments shown in FIGS. 13-16), and a longitudinal axle 98 shaped to be received by the receiving structure 19 in the fastening member 8, preferably alien shaped. Additionally, the socket key 92 has an end portion 100 which has an expandable blocking member 99. In the preferred embodiment, the expandable blocking member 99 is an O-ring. When the socket key 92 is inserted into the fastening member 8 the expandable blocking member 99 will contract thus allowing insertion of the socket key 92. However, after insertion into the fastening member 8, the expandable blocking member 99 will expand thereby blocking the socket key 92 from being removed from the fastening member 8. For example, in the preferred embodiment, the expandable blocking member 99 would contract while inserted in the internal receiving structure 19, but when inserted further into the internal hollow bore past the internal receiving structure 19, the expandable blocking member 99 would expand. Therefore, if the socket key 92 is pulled to the first configuration as shown in (a) of FIG. 29, the expandable blocking member will prevent the socket key 92 from being pulled fully out of the fastening member 8. In other embodiments, the end portion 98 can have other types of blocking members besides O-rings to prevent extraction of the socket key 92.

In another embodiment, the socket key 92 will have a circular shape, or a thinner diameter in an intermediate portion of the socket key, shaped such that it does not engage the receiving structure 19. Therefore, in the second configuration, the socket key could be turned without placing any turning force on the fastening member 8, but instead the socket key would rotate freely. However, the end portion 98, would still be shaped according to the internal receiving structure 19 in order to tighten fastening member 8. However, a lock could be used to prevent the socket key from rotating freely to ensure safety. Accordingly, the advantages of providing these two socket key configurations are that the fastening tool will remain with the foot at all times and will not need to be independently stored or remembered.

What is claimed is:

1. A load carrier foot releasably securable to an external portion of a transporting vehicle for mounting a load carrier bar thereon, said load carrier foot comprising:
a connector for receiving said load carrier cross bar;
a fastening member adapted for tightening said load carrier foot to said external portion of said transporting vehicle thereby securing the load carrier foot to said transporting vehicle;
said fastening member having a tightened configuration wherein said fastening member is tightened to a predetermined tightening force;
a head portion connected with said fastening member, said head portion having a first section and a second section, at least one of said first and second sections being rotatable with respect to the other, and each having visible markings, wherein said head portion comprises a biasing member cooperating with said fastening member and capable of imparting a torque to said fastening member when said head portion is rotated;
said biasing member configured to enable rotation of one of said first and second sections with respect to the other when torque is applied to said biasing member,
said visible markings together forming a visible signal perceivable by an operator upon rotation of one of said first and second sections when said tightened configuration is reached, said predetermined tightening force being reached when a predetermined torque is applied to said biasing member, said visible signal not being viewable by said operator prior to reaching said tightened configuration.

2. The load carrier foot of claim 1, wherein said signal is a predetermined pattern of said visible markings.

3. The load carrier foot of claim 2, wherein said biasing component extends longitudinally from a middle portion of said head portion to at least one end of said head portion and contacts a blocking element in said head portion, said block element has at least one contact surface with said biasing element.

4. The load carrier foot of claim 3, wherein said biasing member extends from a middle center point of said head portion having an extension extending substantially symmetrically from said middle center toward each end of said biasing component each extension on opposite sides of said biasing element having a contact surface therewith.

5. The load carrier foot of claim 3, wherein said contact surface of said blocking element is arcuate shaped.

6. The load carrier foot of claim 5 wherein said biasing member is metal.

7. The load carrier foot of claim 5, wherein the biasing member has a longitudinal planar shape.

8. The load carrier foot of claim 7 wherein said biasing member is deformable across said contact surface of said blocking element upon application of torque to said biasing member.

9. The load carrier foot of claim 8 wherein said biasing member has a first configuration wherein substantially no force is applied to said biasing member and a second configuration where said predetermined torque is applied to said biasing member, wherein in said first configuration, said biasing member contacts said blocking element and is not deformed across said blocking member, and in said second configuration said biasing member twists due to torque applied to said biasing member and is deformed across a length of said blocking element.

10. The load carrier foot of claim 1, wherein said head portion has an outer edge and wherein said visible markings are positioned proximate said outer edge.

11. The load carrier foot of claim 1, wherein said head portion has a substantially rectangular shape and wherein at least a portion of said visible markings are located proximate at least one longitudinal end of said head portion.

12. The load carrier foot of claim 1, wherein said head portion is connected with said fastening member by a longitudinal socket axle, said socket axle being insertable into a hollow bore of said fastening member, said head portion together with said socket axle forming a socket key.

13. The load carrier foot of claim 12, wherein said fastening member has an internal receiving structure for receiving said shaped end portion of said socket key,
said socket key having a first position wherein a portion of said longitudinal socket axle is extended outside of said fastening member and a second position wherein said longitudinal socket axle is inserted in said hollow bore such that said handle head portion is immediately adjacent an aperture of said hollow bore of said fastening member.

14. The load carrier of claim 1 wherein the visible markings are arranged on the external surface of said head portion.

15. The load carrier of claim 1, wherein the visible signal is comprised of a pattern of the visible markings on the outer surface of said head portion indicating a tightened configuration.

16. The load carrier of claim 15, wherein said visible markings comprise a first marking on said first section of said head, and a second marking on said second section, said visible signal comprising an alignment of said first marking and said second marking whereby said tightened configuration is indicated.

17. The load carrier of claim 15, wherein prior to operator rotation of said one of said first and second sections, said fasting member is in an untightened configuration, said visible markings forming an untightened visible signal pattern on the outer surface of said head portion.

18. The load carrier of claim 17, wherein said visible markings comprise a first marking on said first section of said head portion, and a second marking on said second section, said untightened visible signal pattern comprising a first non-aligned position of said first marking and said second marking whereby untightened configuration is indicated.

19. The load carrier of claim 17, wherein upon rotation of one of said first and second sections, said visible markings move from said untightened visible signal pattern toward forming said visible signal indicating a tightened configuration, whereby an operator can perceive the degree of tightening.

20. A load carrier foot securable to an external portion of a transporting vehicle for receiving a load carrier cross bar, said load carrier foot comprising:
a surface for receiving the load carrier cross bar;
a fastener having an elongate extension communicable with the external portion of the transporting vehicle capable of securing and tightening the load carrier foot to said transporting vehicle;
said fastener having a tightened configuration wherein said fastener is tightened to a predetermined tightening force;
a head piece connected with said fastener, said head piece having a first section and a second section, at least one of said first and second sections being rotatable with respect to the other, and each having visible markings;
a biasing member interposed between said first and second sections such that when said head piece is rotated, one of said first and second sections is rotated with respect to the other and said biasing member simultaneously transfers torque to said fastener when said head piece is rotated,
said visible markings together forming a visible pattern on the external surface of the head piece perceivable by an operator upon rotation of one of said first and second sections to where said tightened configuration is reached, said predetermined tightening force being reached when a predetermined torque is applied to said biasing member, said visible pattern not forming prior to reaching said tightened configuration.

21. The load carrier of claim 20 wherein said biasing member is an elongate deformable extension.

22. The load carrier of claim 20, wherein prior to operator rotation of said one of said first and second sections, said fastener is in an untightened configuration, said visible markings forming an untightened visible signal pattern on the outer surface of said head portion.

23. The load carrier of claim 22, wherein upon rotation of one of said first and second sections, said visible markings move from said untightened visible signal pattern toward forming said visible signal indicating a tightened configuration, whereby an operator can perceive the degree of tightening.

* * * * *